US005992971A

United States Patent [19]

Takahashi et al.

[11] Patent Number: 5,992,971

[45] **Date of Patent: *Nov. 30, 1999**

[54] INK JET RECORDING METHOD AND APPARATUS

[75] Inventors: Kiichiro Takahashi, Kawasaki; Naoji Otsuka, Yokohama; Jiro Moriyama; Nobuyuki Kuwabara, both of Kawasaki; Isao Ebisawa, Yokohama; Atsushi Arai; Hisao Yaegashi, both of Kawasaki; Toshiharu Inui, Yokohama; Kentaro Yano, Yokohama; Yuji Akiyama, Yokohama; Hitoshi Sugimoto, Yokohama; Osamu Iwasaki, Tokyo; Daigoro Kanematsu, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/331,103

[22] Filed: Oct. 28, 1994

[30] Foreign Application Priority Data

Oct. 28, 1993 [JP] Japan .................................... 5-270587
Oct. 28, 1993 [JP] Japan .................................... 5-270597

[51] Int. Cl.[6] ................................ B41J 2/21; B41J 29/38; H04N 1/21; H04N 1/23

[52] U.S. Cl. ................................ 347/43; 347/14; 358/298

[58] Field of Search ................................ 347/43, 15, 40, 347/14, 19; 358/458, 523

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,608,577 | 8/1986 | Hori . | |
| 4,723,129 | 2/1988 | Endo et al. . | |
| 4,740,796 | 4/1988 | Endo et al. . | |
| 4,908,712 | 3/1990 | Uchiyama et al. | 358/298 |
| 5,012,257 | 4/1991 | Lowe et al. | 347/43 |
| 5,168,552 | 12/1992 | Vaughn et al. | 395/109 |
| 5,315,382 | 5/1994 | Tanioka | 358/523 |
| 5,339,171 | 8/1994 | Fujisawa et al. | 358/458 |
| 5,428,377 | 6/1995 | Stoffel et al. | 347/15 |
| 5,430,469 | 7/1995 | Shioya et al. | 347/15 |
| 5,506,609 | 4/1996 | Claassen et al. | 347/41 |

FOREIGN PATENT DOCUMENTS

| | | |
|---|---|---|
| 0517468 | 12/1992 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 3146355 | 6/1991 | Japan . |
| 4158049 | 6/1992 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

An ink jet recording method uses black ink and a plurality of inks having different colors, which have ink penetration properties different from that of the black ink. The method includes generating multi-level black recording datum on the basis of a multi-level color recording datum of a discrimination pixel, wherein a ratio of generation of black recording datum is changed in accordance with a multi-level color recording datum of a pixel marginal to the discrimination pixel; and recording a color image on the basis of the multi-level color recording datum and the multi-level black recording datum generated by the generating step.

66 Claims, 21 Drawing Sheets

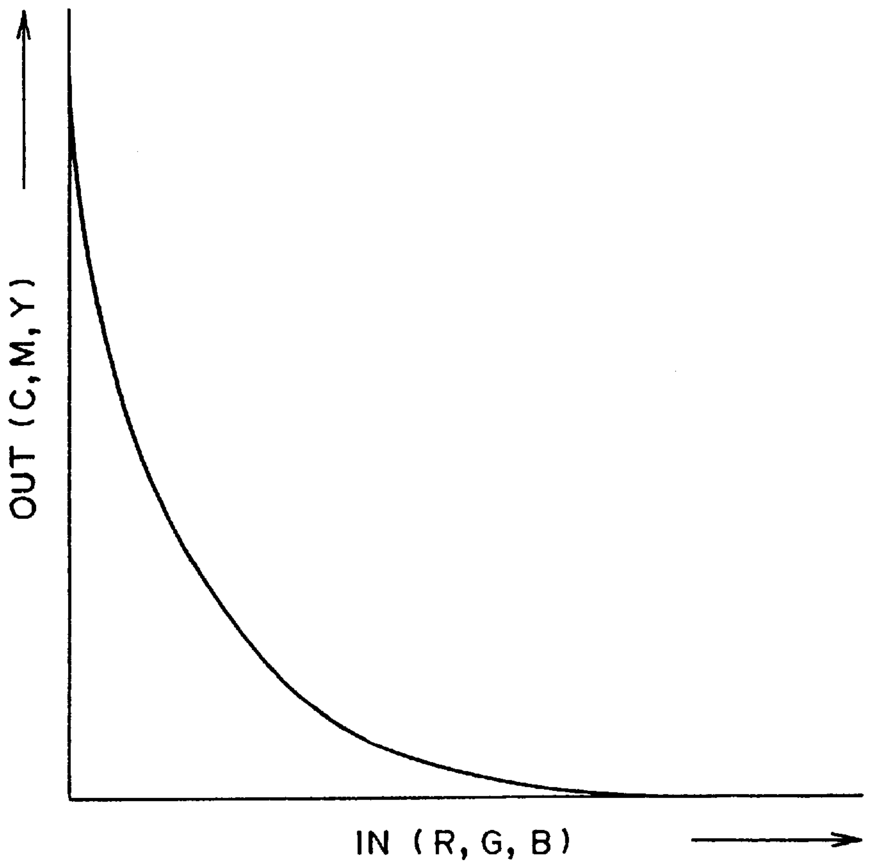
FIG. 6
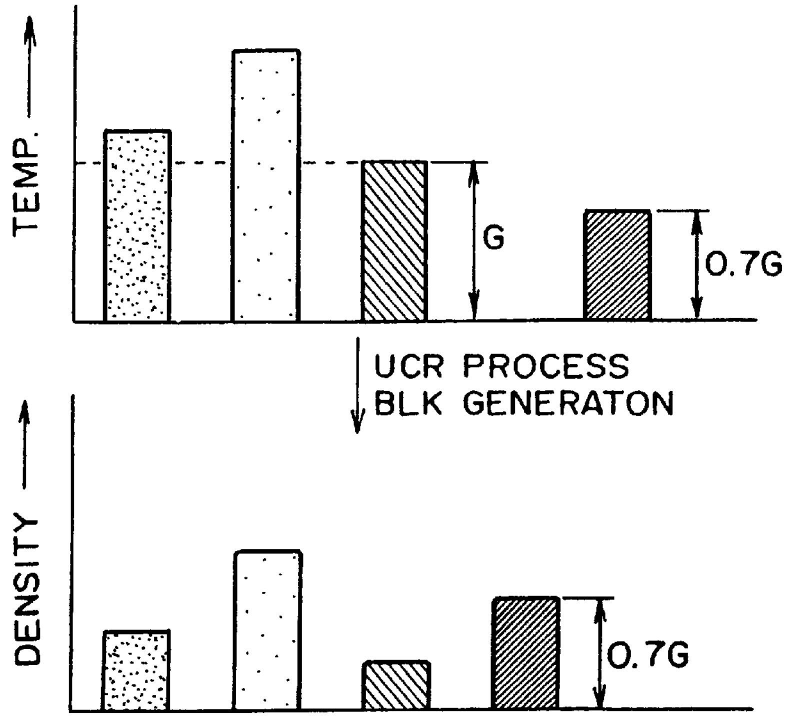
FIG. 7(A)
FIG. 7(B)

| Dmin \ Dmax | 0 | 1 | 2 | 3 | 4 | 5 | 6 | 7 |
|---|---|---|---|---|---|---|---|---|
| 0 | Bk: 0~13% Color: 0~13% | Bk: 0~13% Color: 13~25% | Bk: 0~13% Color: 25~38% | Bk: 0~13% Color: 38~50% | Bk: 0~13% Color: 50~68% | Bk: 0~13% Color: 68~75% | Bk: 0~13% Color: 75~88% | Bk: 0~13% Color: 88~100% |
| 1 | – | Bk: 13~25% Color: 0~13% | Bk: 13~25% Color: 13~25% | Bk: 13~25% Color: 25~38% | Bk: 13~25% Color: 38~50% | Bk: 13~25% Color: 50~68% | Bk: 13~25% Color: 68~75% | Bk: 13~25% Color: 75~88% |
| 2 | – | – | Bk: 25~38% Color: 0~13% | Bk: 25~38% Color: 13~25% | Bk: 25~38% Color: 25~38% | Bk: 25~38% Color: 38~50% | Bk: 25~38% Color: 50~68% | Bk: 25~38% Color: 68~75% |
| 3 | – | – | – | Bk: 38~50% Color: 0~13% | Bk: 38~50% Color: 13~25% | Bk: 38~50% Color: 25~38% | Bk: 38~50% Color: 38~50% | Bk: 38~50% Color: 50~68% |
| 4 | – | – | – | – | Bk: 50~68% Color: 0~13% | Bk: 50~68% Color: 13~25% | Bk: 50~68% Color: 25~38% | Bk: 50~68% Color: 38~50% |
| 5 | – | – | – | – | – | Bk: 68~75% Color: 0~13% | Bk: 68~75% Color: 13~25% | Bk: 68~75% Color: 25~38% |
| 6 | – | – | – | – | – | – | Bk: 75~88% Color: 0~13% | Bk: 0~13% Color: 13~25% |
| 7 | – | – | – | – | – | – | – | Bk: 88~100% Color: 0~13% |

FIG. 13

| Dmax / Dmin | 0 | 1 | 2 | 3 | 4 | 5 | 6 | 7 |
|---|---|---|---|---|---|---|---|---|
| 0 | 100 | 80 | 60 | 40 | 30 | 20 | 10 | 0 |
| 1 | – | 100 | 80 | 60 | 40 | 30 | 20 | 10 |
| 2 | – | – | 100 | 80 | 60 | 40 | 30 | 20 |
| 3 | – | – | – | 100 | 90 | 70 | 50 | 30 |
| 4 | – | – | – | – | 100 | 90 | 70 | 50 |
| 5 | – | – | – | – | – | 100 | 90 | 70 |
| 6 | – | – | – | – | – | – | 100 | 90 |
| 7 | – | – | – | – | – | – | – | 100 |

[%]

FIG. 14

50%PCBk

Bk ~ 50%
C ~ 50%
M ~ 25%
Y ~ 50%

FIG. 21(A)
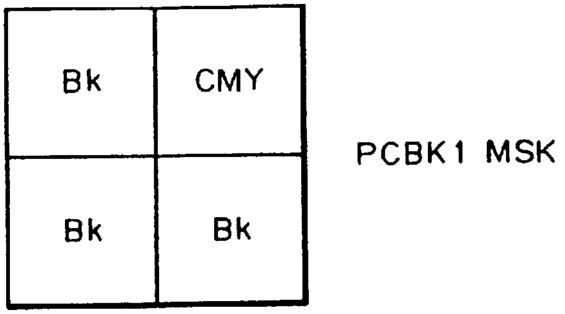
FIG. 21(B)
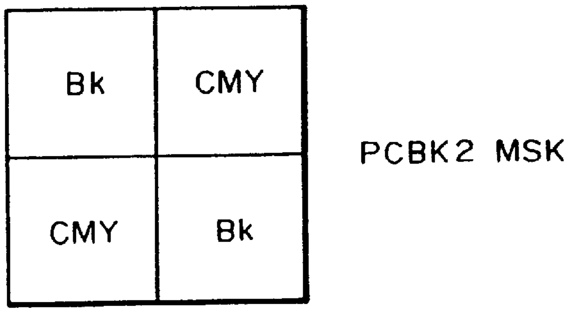
FIG. 21(C)
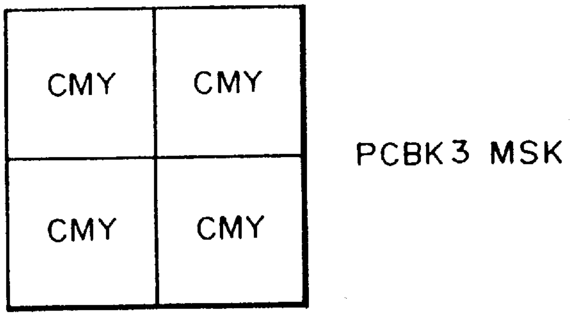
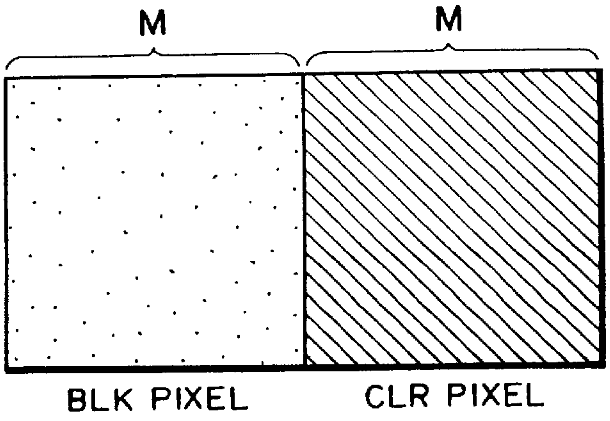
FIG. 22

INK JET RECORDING METHOD AND APPARATUS

FIELD OF THE INVENTION AND RELATED ART

The present invention relates to a color ink jet recording method and apparatus capable of recording color images with sharpness and high density, more particularly to color ink jet recording method and apparatus using color inks such as yellow, magenta, cyan or the like inks and black ink.

The present invention is applicable to an apparatus for a recording material such as paper, cloth, unwoven material, OHP sheet or the like, more particularly to a printer, copying machine, facsimile machine and another office equipment or mass-production equipment or the like.

An ink jet recording method is used for a printer, copying machine, facsimile machine or the like because of the low noise, low running cost, small size and easiness for the color printing.

When an ink jet recording method is used for a color recording apparatus, a special sheet having an absorbing layer is used to provide high quality color images with clear color and without ink mixture. Recently, the ink has been improved to permit use of plain paper. However, the print quality on the plain paper is not satisfactory. One of the most important problems is the satisfaction of both of the prevention of the mixture between different color inks and accomplishment of black recording (black characters).

Usually, when a color image is to be recorded on plain paper through ink jet recording method, quick-drying ink having high penetration speed is used. By doing so, the color image portion is of high quality without the ink mixture. However, the black image has low density with so-called feathering (ink expansion along fibers of paper).

When the black image is printed on a color background, the problem with the black image is less remarkable, and therefore, the print quality is not remarkably deteriorated. However, the black image exists independently of the color image, the print quality is degraded. When the black image is characters, the insufficient sharpness results in poor image quality.

In order to provide high quality image with high density in the black image without feathering, it is desired that a relatively large number of shots of the ink having a relatively low penetration speed are applied for the plain paper. However, in this case, the color mixture between the black ink and the color ink occurs at the boundary between the black image and the color image with the result of remarkable image quality deterioration.

The problem of the ink mixture can be improved to a certain. degree by using a so-called fine mode in which the image is formed by a plurality of main scanning operations, but the problem of the black image quality is not essentially solved as yet.

Thus, the improvement of the color recording quality by the satisfaction both of the prevention of the mixture among the black and color inks and the reduction of the feathering, particularly, the feathering of the black ink, is desired.

Japanese Laid-Open Patent Application No. 146355/1991 proposes that no recording is effected in the area of the boundary between the black part and the color part. However, with the method, the data to be recorded is changed.

Japanese Laid-Open Patent Application No. 158049/1992 proposes that a plurality of color recording heads and a character recording head are used, and the heads are selectively used depending on the nature of the image to be recorded. However, with this method, the recording head dedicated to the character recording is required in addition to the already required plurality of color recording heads, with the result of the bulkiness and the high cost of the apparatus.

SUMMARY OF THE INVENTION

Accordingly, it is a principal object of the present invention to provide an ink jet recording method and apparatus in which the color mixture can be suppressed without changing color tone when a black image area contacted to a color image area is to be recorded.

It is another object of the present invention to provide an ink jet recording method and apparatus in which a satisfactory printing quality is provided without the mixture among the black and color inks, and in addition the feathering is suppressed in the black image area, that is, a high quality black recording and high quality color recording are both satisfied.

According to an aspect of the present invention, there is provided an ink jet recording method using black ink and a plurality of inks having different colors, which have ink penetration properties different from that of the black ink, the method comprising the steps of: generating multi-level black recording datum on the basis of a multi-level color recording datum of a discrimination pixel, wherein a ratio of generation of black recording datum in accordance with a multi-level color recording datum of a pixel marginal to the discrimination pixel; and recording a color image on the basis of the multi-level color recording datum and the multi-level black recording datum generated by the generating step.

According to another aspect of the present invention, there is provided a data processing method for recording with use of black ink and a plurality of inks having different colors, which have ink penetration properties different from that of said black ink, said method comprising the steps of: obtaining a multi-level color recording datum of a pixel marginal to a discrimination pixel; and generating a multi-level black recording datum on the basis of a multi-level color recording datum of the discrimination pixel at a ratio in accordance with the multi-level color recording datum of the marginal pixel.

According to a further aspect of the present invention, there is provided an ink jet recording method using black ink and a plurality of inks having different colors, which have ink penetration properties different from that of said black ink, said method comprising the steps of: generating multi-level black recording datum on the basis of a multi-level color recording datum of a discrimination pixel; converting the multi-level black recording datum generated by said generating step to a multi-level color recording datum in accordance with a multi-level recording datum of a pixel marginal to the discrimination pixel; and recording a color image on the basis of the thus converted multi-level color recording datum and the multi-level black recording datum.

According to a further aspect of the present invention, there is provided a data processing method for recording with use of black ink and a plurality of inks having different colors, which have ink penetration properties different from that of said black ink, said method comprising the steps of: generating multi-level black recording datum on the basis of a multi-level color recording datum of a discrimination pixel; converting the multi-level black recording datum generated by said generating step to a multi-level color recording datum in accordance with a multi-level recording datum of a pixel marginal to the discrimination pixel.

According to a further aspect of the present invention, there is provided an ink jet recording apparatus using black ink and a plurality of inks having different colors, which have ink penetration properties different from that of said black ink, said apparatus comprising: means for discriminating a color component of a pixel marginal to a discrimination pixel; determining means for determining a ratio of a black generation for the discrimination pixel in accordance with the color component discriminated by said discriminating means; generating means for generating a black component for the discrimination pixel on the basis of the black component and the color component; and ejecting means for ejecting the black ink and the color ink on the basis of the black component and the color component.

According to a further aspect of the present invention, there is provided an ink jet recording apparatus using black ink and a plurality of inks having different colors, which have ink penetration properties different from that of said black ink, said apparatus comprising: means for generating a multi-level black recording datum from a multi-level color recording datum of a discrimination pixel; means for converting a multi-level black recording datum of the discrimination pixel generated by said generating means to a multi-level color recording datum in accordance with multi-level color recording datum of a pixel marginal to the discrimination pixel; ejecting means for ejecting the black ink and the color ink on the basis of the multi-level color recording datum and multi-level black recording datum.

According to a further aspect of the present invention, there is provided an ink jet recording method using black ink and a plurality of inks having different colors, which have ink penetration properties different from that of said black ink, said method comprising the steps of: detecting a duty of black image recording in a specified area on in a recording position of a recording material; changing a ratio of black image recording by mixture of a plurality of the color inks to black image recording by the black ink in a black image area, in accordance with the duty detected by said detecting means; and effecting recording on the basis of the ration changed by said changing means.

According to a further aspect of the present invention, there is provided an ink jet recording method using black ink and a plurality of inks having different colors, which have ink penetration properties different from that of said black ink, said method comprising the steps of: discriminating a black image area adjacent to a color image; calculating a color recording duty in an area marginal to a black image area adjacent to the color image; deteterming a ratio of black image recording by mixture of a plurality of the color inks to black image recording by the black ink in the black image area, in accordance with a result of calculation of said calculating means; and effecting recording on the basis of the ratio of the black image recording determined by said determining means.

According to a further aspect of the present invention, there is provided an ink jet recording apparatus using black ink and a plurality of inks having different colors, which have ink penetration properties different from that of said black ink, said method comprising: means for detecting a duty of color image recording in a specified area on in a recording position of a recording material; means for changing a ratio of black image recording by mixture of a plurality of the color inks to black image recording by the black ink in a black image area, in accordance with the duty detected by said detecting means; and means for effecting recording on the basis of the ratio changed by said changing means.

According to a further aspect of the present invention, there is provided an ink jet recording apparatus using black ink and a plurality of inks having different colors, which have ink penetration properties different from that of said black ink, said method comprising: means for discriminating a black image area adjacent to a color image; means for calculating a color recording duty in an area marginal to a black image area adjacent to the color image; means for determining a ratio of black image recording by mixture of a plurality of the color inks to black image recording by the black ink in the black image area, in accordance with a result of calculation of said calculating means; and driving means for effecting recording on the basis of the ratio of the black image recording determined by said determining means.

According to a further aspect of the present invention, there is provided an ink jet recording method using black ink and a plurality of inks having different colors, which have ink penetration properties different from that of said black ink, said method comprising the steps of: recording in a color image area with the color inks; recording in a black image area with the black ink; and recording in the black image area with the color inks, at least the black image area recorded with the color inks is recorded with the black ink at a ratio in accordance with a marginal image.

According to a further aspect of the present invention, there is provided a recorded product provided by black ink and a plurality of inks having different colors, which have ink penetration properties different from that of said black ink, said product comprising: color inks deposited on a color image area; black ink deposited on a black image area; and color inks deposited at least on the black image area, wherein the black image area recorded with the color inks has been recorded with the black ink at a ratio in accordance with a marginal image.

According to an aspect of the present invention, the amount of Bk data production produced from color data for one pixel can be changed in accordance with information of marginal pixel or pixels, and therefore, the recording data can be produced so that the color mixture and the color tone change is not remarkable.

That is, according to this invention, the recording data can be handled on the basis of the multi-level information unchanged, and therefore, the amount of the Rk data gradually change at the interface between the color image and the black image, by which the color tone change is made less conspicuous. In addition, as regards the color mixture, the boundary between the color and the black is not easily produced, and therefore, the boundary is not remarkable. By doing so, the interface can be smoothly formed.

According to an aspect of the present invention, the color mixture at the boundary between the black image and the color image can be reduced, and the high black image without feathering can be produced.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6 illustrates input (R, G, B)—output (C, M, Y) in an image processing.

FIGS. 7(A) and 7(B) illustrate an UCR process and black generation process.

FIG. 13 is an illustration of a color component to be discriminated illumination to Dmax and Dmin in Embodiment 1.

FIG. 14 is a table for black production amount determined on the basis of the relationship of Dmax and Dmin in Embodiment 1.

FIGS. 21(A)–21(C) are illustrations of example of a patterns of PCBk masks used in PCBk substitution.

FIG. 22 is an illustration of an example of a relationship of a black recording pixel and a color recording pixel of an original at a specified area.

DESCRIPTION OF THE PREFERRED EMBODIMENTS

Prior to describing an embodiment of the present invention, copending U.S. application Ser. No. 08/094,849 which has been assigned to the assignee of this application will be described, for the purpose of better understanding of the present invention. In the application, color ink is overlaid to a black area along an interface between the black and the color, thus preventing the color mixture in the interface area. The black image formed with the use of color inks is called "PCBk" (process color black). With this method, a problem arises in the color tone in the black area provided by the color inks and the part where the black and color inks are mixed at a ratio.

Figure 18:
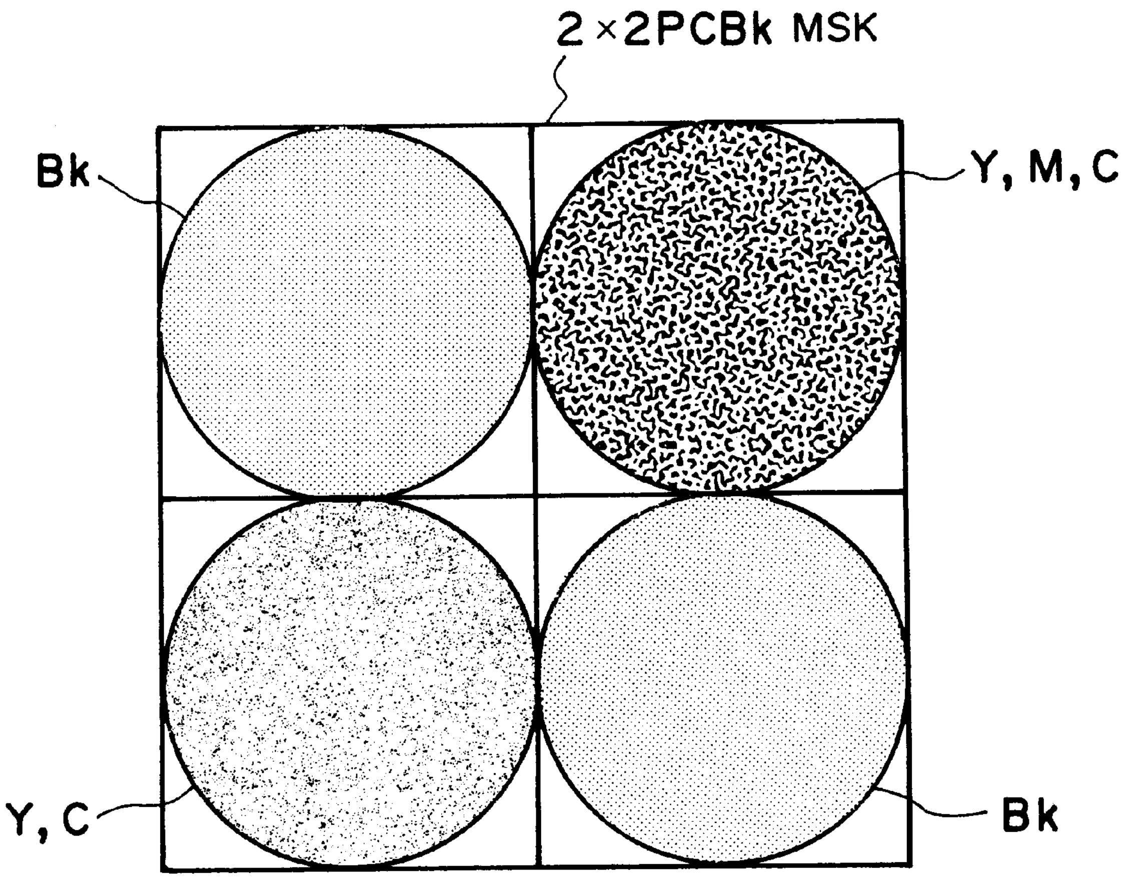
FIG. 18 is an illustration of a basic pattern of PCBk mask used for PCBk substitution.

Among the methods for substituting the Bk at the interface or boundary with the PCBk, it is a most simple method that a special mask pattern is used when the black data is converted to color data. FIG. 18 shows an example, wherein 100% Bk is converted as follows:

Bk—50%

C—50%

M—25%

Y—50%

The PCBk provided by this ratio is intended to make the color tone closer to 100% Bk as much as possible.

However, it is not possible to provide exactly the same color tone. Therefore, in an area where a part substituted by PCBk and 100% Bk are adjacent to each other, the color tone difference is remarkable by the user as a defect, with the result that the image quality is deteriorated at the boundary between the black image and the color image.

Referring to the accompanying drawings, an embodiment of the present invention will be described.

Figure 1:
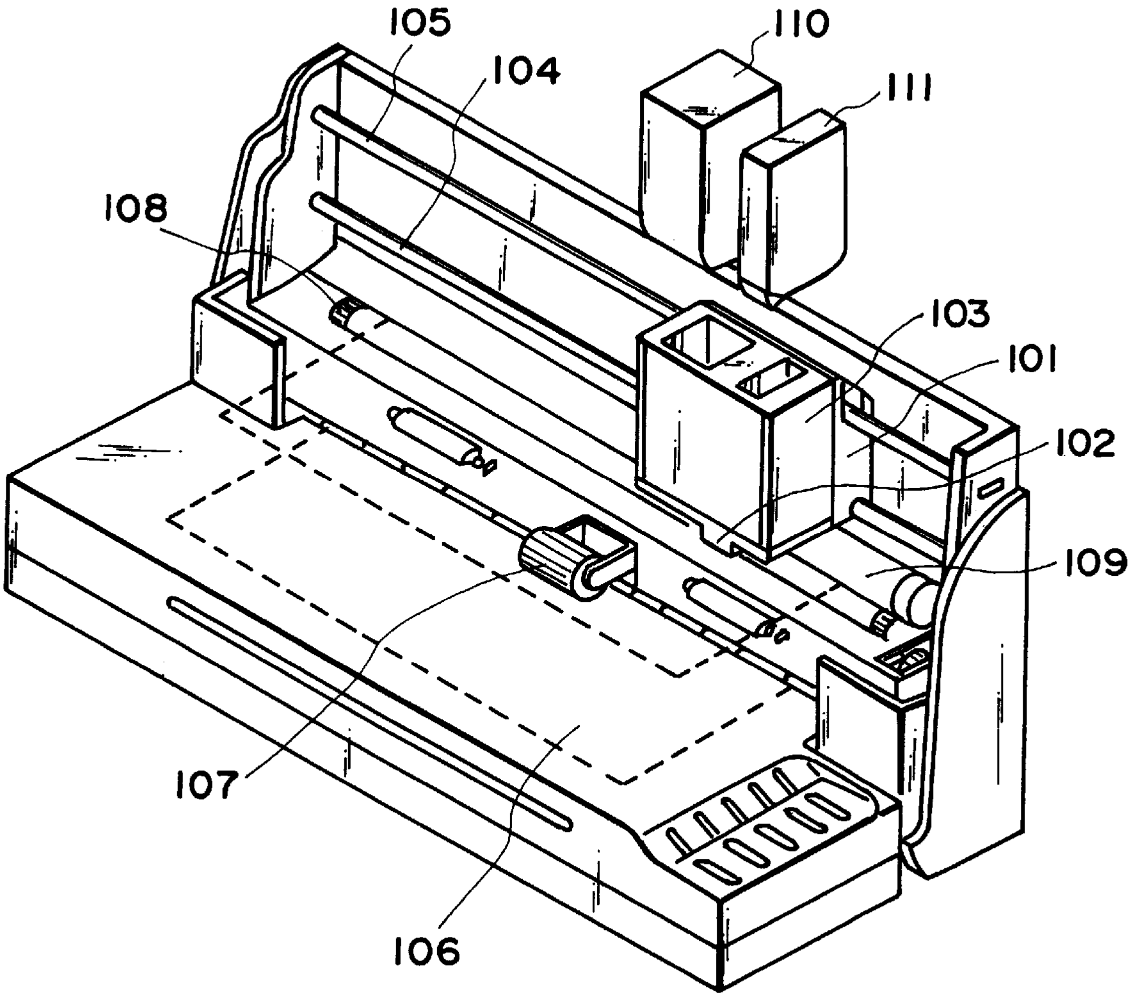
FIG. 1 is a perspective view of an ink jet recording apparatus to which the present invention is applicable.

FIG. 1 is a perspective view of a recording apparatus to which an ink jet recording method of the present invention is usable. A carriage 101 functions to carry a recording head 102 and a cartridge guide 103, and is scanningly movable along guiding shafts 104 and 105.

The recording paper 106 is fed into a main assembly of the apparatus by a pick-up roller 107, and is fed onto a sheet feeding roller 108 by an unshown pinch roller (not shown) and a sheet confining plate 109. The usable ink cartridges include a color ink cartridge 110 containing yellow, magenta and cyan inks, and a black cartridge 111. These cartridges are inserted independently, and are brought into fluid communication with the recording head 102.

The yellow, magenta and cyan inks contained in the color ink cartridge 110 have high penetration speed into the recording paper or sheet so as to prevent ink mixture at the color boundary upon color image printing. On the other hand, the black ink contained in the black ink cartridge 111 has a lower penetration speed as compared with the though color inks so as to provide high quality printing with less feathering and with high density.

Figure 2A:
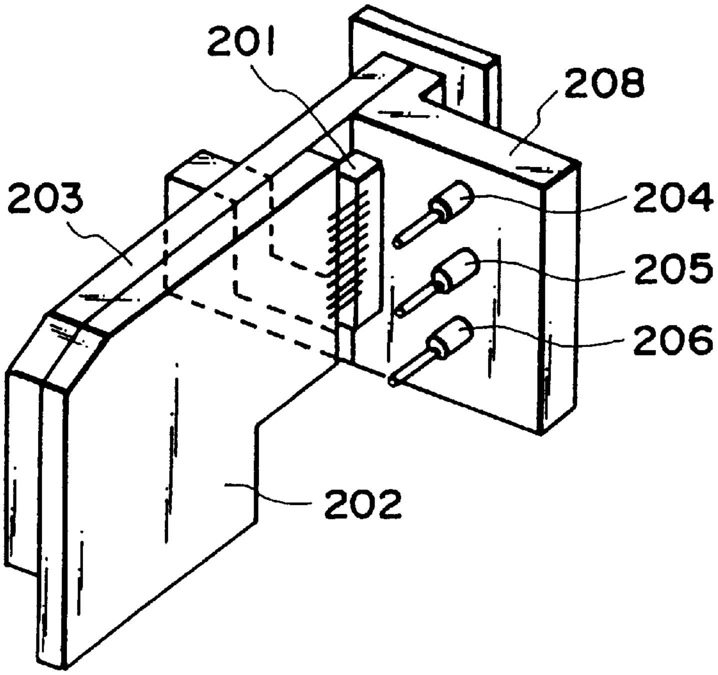
FIGS. 2(A) and 2(B) show a recording head of an ink jet recording apparatus to which the present invention is applicable.
Figure 2B:
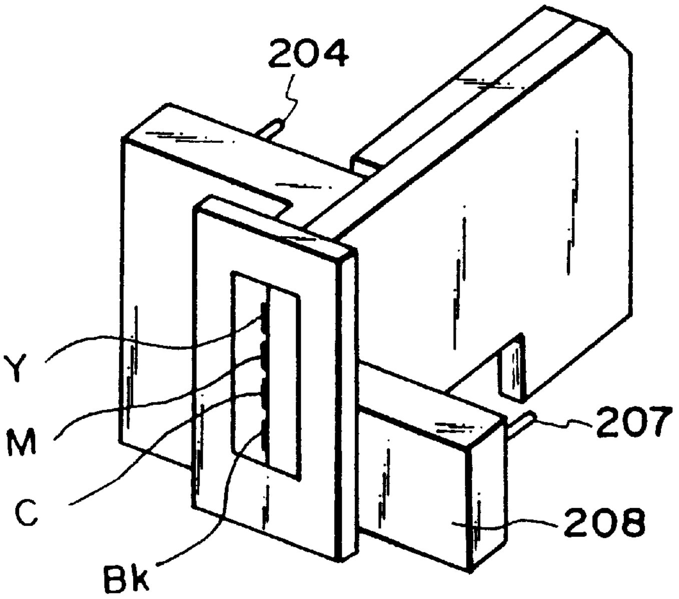

FIGS. 2(A) and 2(B) show a recording head 102. It has, in its front side, a group of yellow, magenta, cyan and black ejection outlets. Each group has 24 yellow, Magenta and cyan ejection outlets, and 64 black outlets. The space between adjacent different color nozzles is not less than the interval of the nozzle pitch of one color. The nozzle interval is 70.5 mm, that is, the resolution is 360 dpi (dot per inch).

Each ejection outlet is in fluid communication with an ink passage which in turn is in fluid communication with a common liquid chamber. Each ink passage is provided with an electrothermal transducer for producing thermal energy to eject a droplet of ink through the ejection outlet and electric wiring for supplying electric power thereto. The electrothermal transducer (ejection heater) and electrode wiring are formed by film formation process on a substrate 201 of silicon or the like. By lamination of partition walls and top plate or the like of plastic resin material or glass material on the substrate, the ejection outlets, the ink passages and the common chamber are constituted. Further behind, driving circuit for driving the electrothermal transducer in accordance with the recording signal is printed on the substrate.

Without use of the glass material, it is an alternative that the plurality of ink passages may be constituted by an orifice plate having grooves and recesses for the common liquid chamber and partition walls, and the substrate, which are bonded to each other. The top plate may be integrally formed from the material of polysulfone which is preferable, or another molding resin material.

Pipes 204–207 are extended out of a plastic member 208 (distributor) extending vertically from the silicone substrate, and are in fluid communication with passages, which are in fluid communication with the common liquid chamber.

Four such passages are formed in the distributor, for yellow, magenta, cyan and black. They are in fluid communication with the associated ones of the common liquid chambers.

The embodiment uses independent ink containers, one for the color inks, and the other for the black ink. It may be in the form of a disposable type recording head in which the ink container and the printing head are integral with each other.

From the ejection outlets for the yellow, magenta and cyan in the recording head 102, approx. 47 ng ink is ejected, and from the black ejection outlet, approx. 80 ng ink is ejected.

The prescriptions of the inks used in this embodiment is as follows:

| | |
|---|---|
| 1. Y (yellow) | |
| C.I. Direct Yellow 86 | 3 parts |
| Diethylene glycol | 10 parts |
| Isopropyl alcohol | 2 parts |
| Urea | 5 parts |
| Acetirenol EH (available from Kawaken Chemical, Japan) | 1 part |
| Water | rest |
| 2. M (magenta) | |
| C.I. Ashed Red 289 | 3 parts |
| Diethylene glycol | 10 parts |
| Isopropyl alcohol | 2 parts |
| Urea | 5 parts |
| Acetirenol EH (avaliable from Kawaken Chemical, Japan) | 1 part |
| Water | rest |
| 3. C (cyan) | |
| C.I. Direct Blue 199 | 3 parts |
| Diethylene glycol | 10 parts |
| Isopropyl alcohol | 2 parts |
| Urea | 5 parts |
| Acetirenol EH (available from Kawaken Chemical, Japan) | 1 part |
| Water | rest |
| 4 Bk (black) | |
| C.I. Direct Black 154 | 3 parts |
| Diethylene glycol | 10 parts |
| Isopropyl alcohol | 2 parts |
| Urea | 5 parts |
| Water | rest |

Thus, unlike the black ink, the cyan, magenta and yellow inks contain 1% of Acetirenol EH so as to enhance the penetration power. Another example of the additive includes another surfactant or alcohol or the like.

Figure 3:
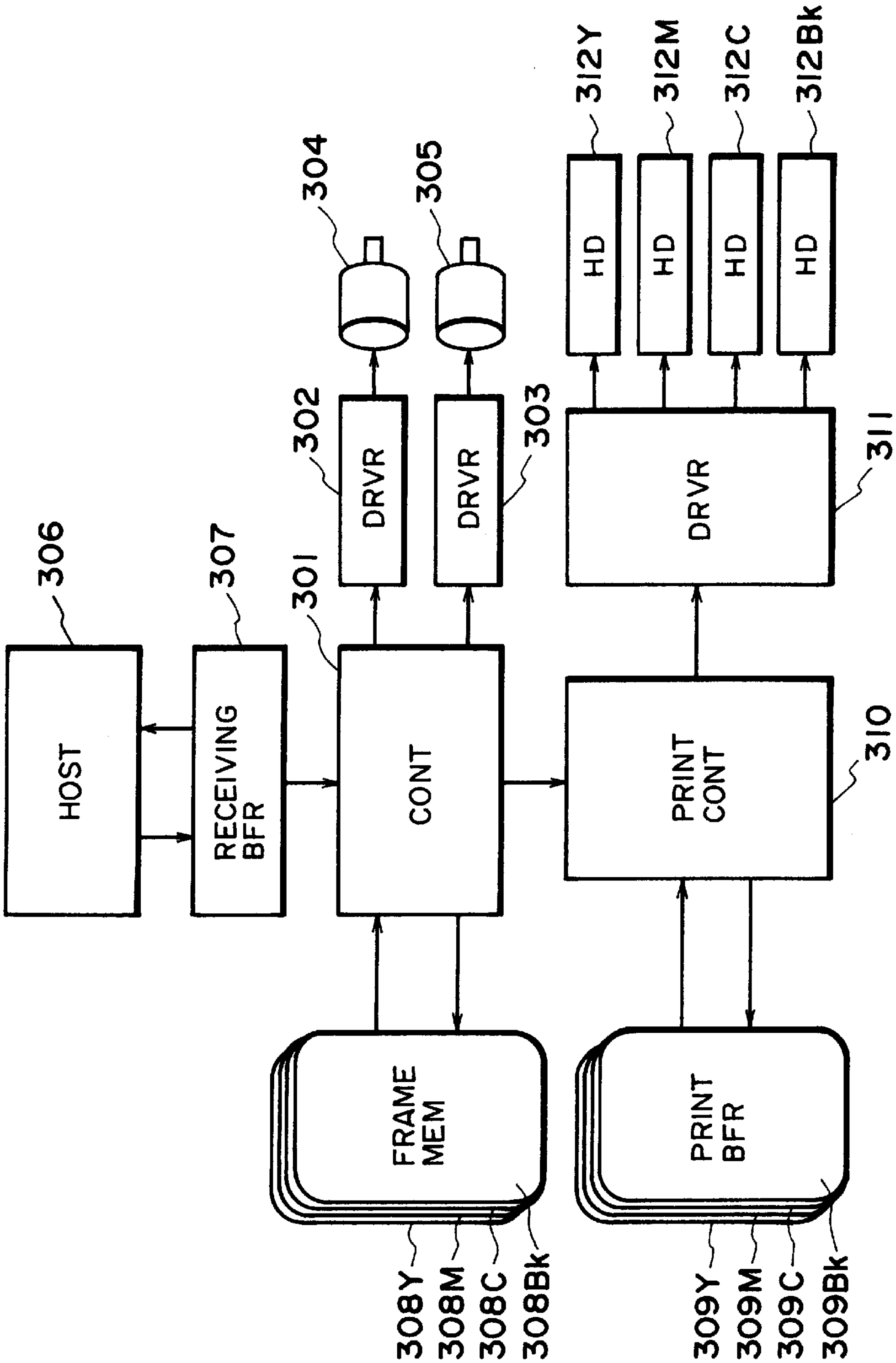
FIG. 3 is a block diagram of a control circuit for an ink jet recording apparatus to which the present invention is applicable.

FIG. 3 is a block diagram of an electric control circuit of a color ink jet printer.

Designated by a reference numeral 301 is a system controller for controlling the entirety of the apparatus, and includes a microprocessor, a memory element (ROM) storing a control program, a memory element (RAM) used by the microprocessor for the operation thereof or the like. A driver 302 functions to drive the recording or printing head in a main scan direction, and a driver 303 functions to move in the sub-scan direction. Designated by 304 and 305 are motors corresponding to the respective drivers and receive information relating to speed and distance from the driver.

A host computer 306 functions to transfer the information to the printed to the printing apparatus according to this embodiment. A reception buffer 307 temporarily stores the data from the host computer 306, and keeps the data until the data is read from the system controller 301. A frame memory 308 functions to convert the data to be printed to image data, and has a memory size required for the printing operation. In this embodiment, it can store the data for one page of the printing sheet. However, the present invention is not limited to this size of the frame memory.

A memory element 309 functions to temporarily store the data to be printed. The capacity of the memory depends on the number of nozzles of the recording head. A print controller 310 functions to properly control the printing head in accordance with the instructions from the system controller, more particularly, it controls the ejection speed and the number of print data or the like. A driver 311 functions to drive yellow ink nozzle (head) 312Y, a magenta ink nozzle (head) 312M, a cyan ink nozzle (head) 312C and a black ink nozzle (head) 312Bk

Image Processing

Figure 4:
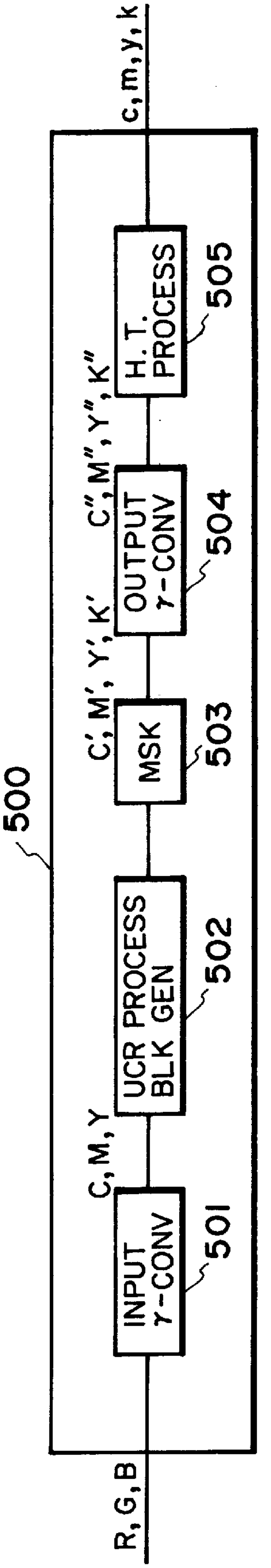
FIG. 4 is a block diagram for image processing to which the present invention is applicable.

The description will be made as to the image processing function for supplying to the recording apparatus the image data to be printed. FIG. 4 is a block diagram illustrating this function, the image processor 500 comprises the following:

(1) Input γ conversion 501

(2) UCR (Under Color Remove) and black generation 502

(3) Masking 503

(4) Output γ conversion 504

(5) Halftone processing 505

Figure 5:
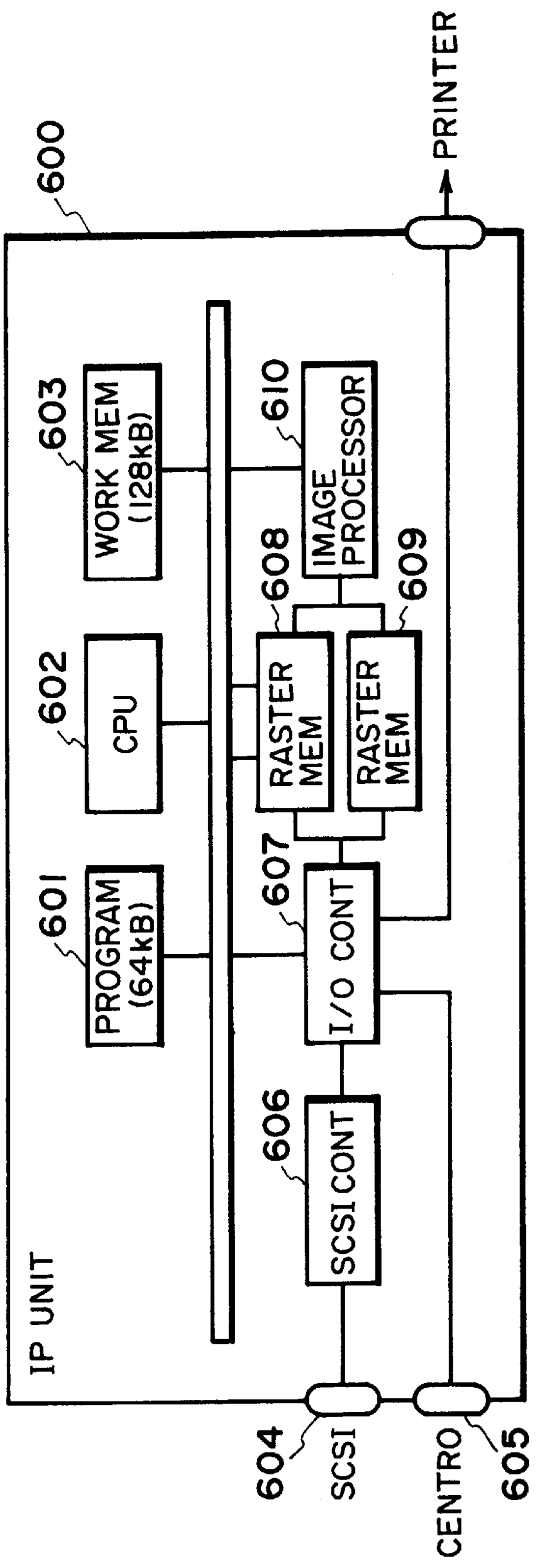
FIG. 5 is a block diagram of an inside of a color printer to which the present invention is applicable.

In addition to the image processing functions enumerated above, there is an enlargement function for the image data. In this embodiment, as shown in FIG. 5 which is an example of a general block diagram, the function corresponds to a plurality of input data formats, and the input interface is provided both for SCSI 604 and Centronics 605.

In addition to the image processor 500, there are an SCSI controller 606, input-output controller 607, memories 608 and 608 for two rasters (toggling), CPU 602 for controlling them, program memory 601 and working memory 603. The working memory 603 includes an output buffer for storing binarized data.

(1) Input γ Conversion

Generally, color image data used in the computer are represented by intensities (light quantities) of R, G and B. In the recording apparatus the same colors are represented by quantities of ejection (density) of cyan (C), magenta (M), yellow (Y) which are complementary colors relative to R, G, B. Therefore, it is necessary to convert R, G and B data supplied from the computer into C, M, Y density data through one or another method. The density can be obtained by logarithm conversion of a reciprocal of reflection ratio, and therefore, reciprocals of R, G, B (light quantity) data are converted to logarithmic data, thus producing image density data. The density data after conversion C, M, Y, are converted through the following equations (1):

$$C=-255/ar\cdot\log(R/255)$$

$$M=-255/ag\cdot\log(G/255)$$

$$Y=-255/ab\cdot\log(B/255) \quad (1)$$

When the image displayed on a monitor is to be reproduced, the following conversion is required to compensate for the non-linearity of the monitor:

$$C=-255/ar\cdot\log(R^{2.2}/255)$$

$$M=-255/ag\cdot\log(G^{2.2}/255)$$

$$Y=-255/ab\cdot\log(B^{2.2}/255) \quad (1')$$

($0 \leqq R, G, B, C, M, Y \leqq 255$, ar, ag, ab: const.)

In practice, values obtained using equation (1) or (1'), are stored in L.U.T. (Look Up Table), and the densities (C, M, Y) corresponding to the inputs (R, G, B) are outputted.

(2) UCR and Black Generation

"UCR" means that an achromatic component not contributable to the color is removed at a certain ratio from the values of C, M and Y obtained from equation (1) or (1'). Black production or generation means that the black is added at a certain ratio to compensate for the removed achromatic component. FIG. 7 shows the behaviors in the UCR and black production processes.

FIG. 7A shows the densities of C, M, Y obtained by equation (1) or (1') and UCR component therein (70% of minimum Y in this embodiment). FIG. 1B shows the densities C', M', Y' and K' after UCR and black generation processes as shown in FIG. 7A. In this example, the amounts of UCR and black generation are 70% of achromatic component G. Usually, the values are empirically determined. The ink densities after the UCR and black generation processes, are as follows:

$$C'\rightarrow C-au\cdot\min(C, M, Y)$$

$$M'\rightarrow M-au\cdot\min(C, M, Y)$$

$$Y'\rightarrow Y-au\cdot\min(C, M, Y)$$

$$K'\rightarrow as\cdot\min(C, M, Y) \quad (2)$$

Where min (C, M, Y) is minimum of C, M, Y obtained by equation (1) or (1'), au is an amount of UCR and as is a coefficient determining the black generation amount.

The use of the black ink in the color printing provides the following advantages:

1. The density in the high density portion is made higher than the case in which only cyan, magenta and yellow colors are used, and therefore, better tone reproducibility is provided.

2. A quantity of inks ejected onto the recording sheet is reduced.

(3) Masking

As for the cyan, magenta and yellow inks which have complementary colors relative to R, G, B, it is ideal that C ink absorbs only R, that M ink absorbs only G and that Y ink absorbs only B. However, the actual inks do not have such ideal absorbing properties, but C ink absorbs more or less G and B as well as R. Similarly, the other inks absorb the color other than the complementary color. The masking functiuns to correct the undesirable absorption. The equation for the correction is as follows:

$$C'=P11\cdot C+P12\cdot M+P13\cdot Y$$

$$M'=P21\cdot C+P22\cdot M+P23\cdot Y$$

$$Y'=P31\cdot C+P32\cdot M+P33\cdot Y \quad (3)$$

The parameters P11–P33 used in the above equation are determined such that the differences between the input image colors represented by R, G and B and the colors represented by C', M' and Y', are minimum.

An example of UCR, black generation and masking processes is as follows:

$$C'=P11\cdot C+P12\cdot M+P13\cdot Y+P14\cdot Bk+P15\cdot Bk^2$$

$$M'=P21\cdot C+P22\cdot M+P23\cdot Y+P24\cdot Bk+P25\cdot BK^2$$

$$Y'=P31\cdot C+P32\cdot M+P33\cdot Y+P34\cdot Bk+P35\cdot Bk^2$$

$$K'=P41\cdot C+P42\cdot M+P43\cdot Y+P44\cdot Bk+P45\cdot Bk^2 \quad (4)$$

where Bk=min (C, M, Y). In the equation (4), the consideration is paid up to the secondary order of Bk ($Bk^2$). The second order term is not influential in a high light portion in the image data, but the influence is increased with the increase of the density. Usually, the UCR and the black generation processes are not effected for the light portion of the image, but they are effected for a portion having a density higher than a predetermined density. By using the second order term, the above-described effects are provided.

(4) Output γ Conversion

Figure 8A:
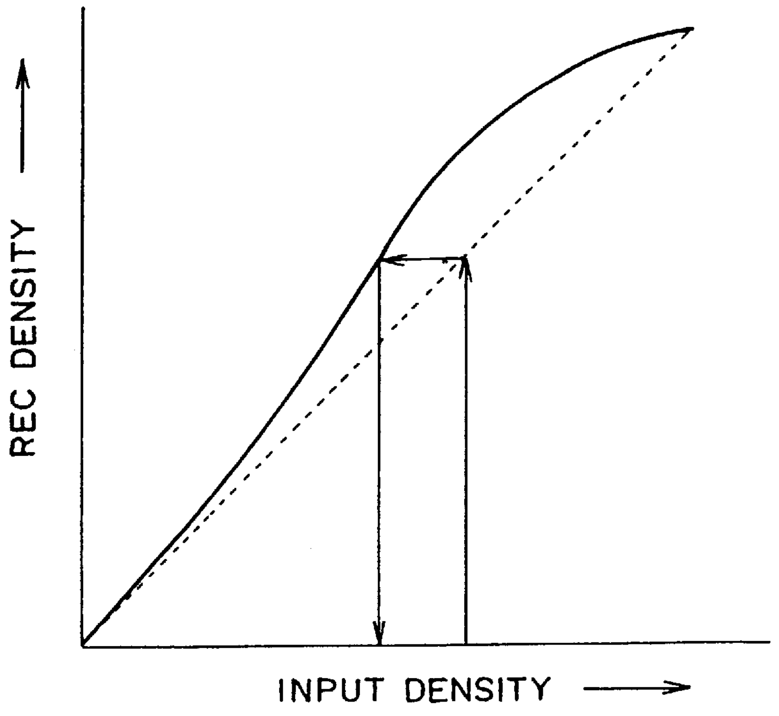
FIGS. 8(A) and 8(B) show a tone reproducing property and correction table recording to recording density.
Figure 8B:
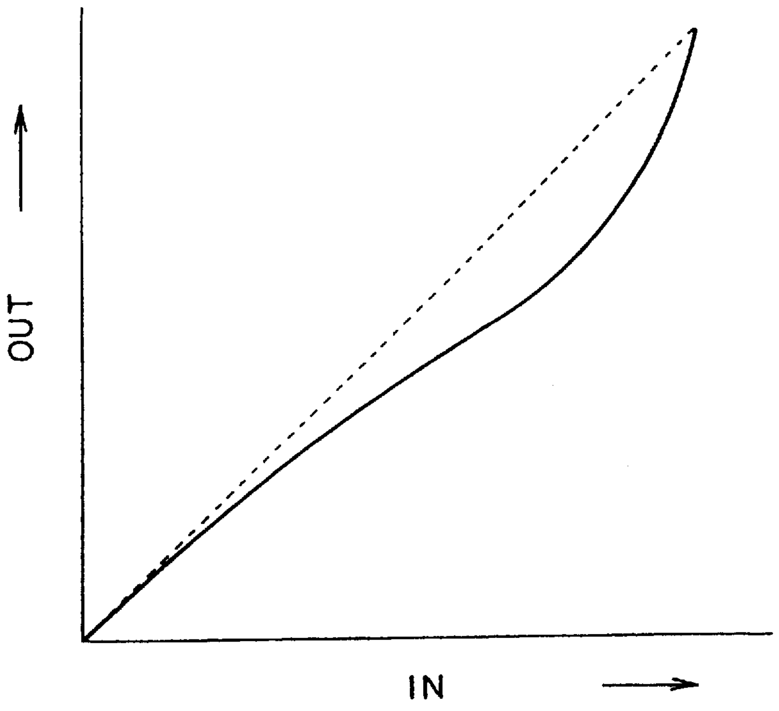

The output γ conversion function is to convert the ink densities C', M', Y', K' provided by the above-described UCR, black generation and masking functions, and in the function, three tables for the tone correction, lightness adjustment and color balance, respectively, are combined. By the tone correction, the linear recording density is the object. The tone gradation property of the density of the record is different depending on the used ink, size of the ink droplets, the material of the print sheet and in addition the method of tone gradation simulation process. The method of correction is such that a correction table for the input image density is produced so that the recording density is linear, beforehand. The ink densities C', M', Y', K' provided by the above-described color correction functions are corrected by this correction table. The ink densities C", M", Y", K" thus corrected are supplied to the tone gradation simulation process. The correction tables are prepared for each color. FIG. 8A shows the tone gradation property of the recorded density without this correction, and FIG. 8B shows the correction (conversion) table therefor.

Figure 9:
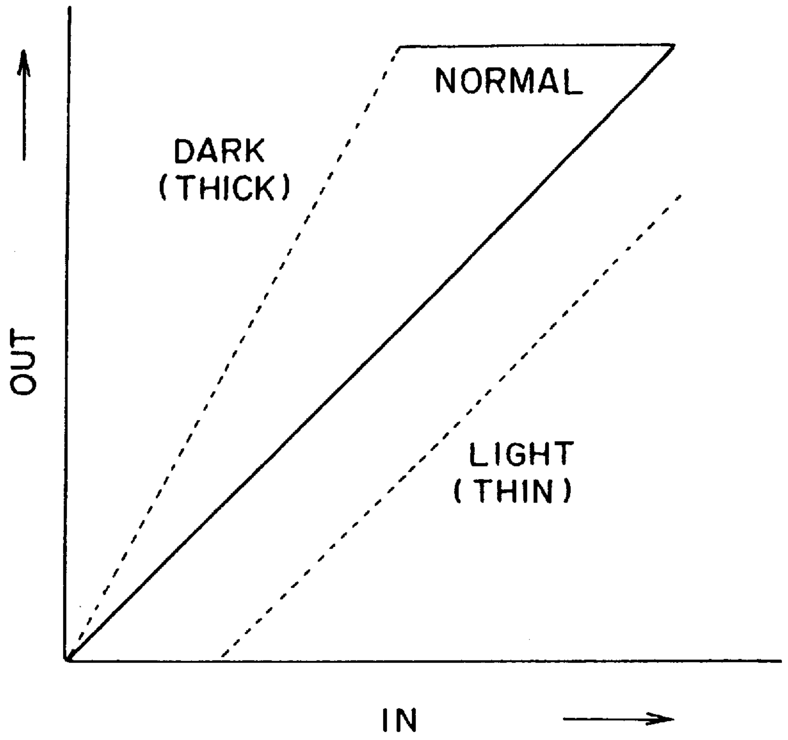
FIG. 9 illustrates a record density adjustment.

The lightness adjustment is to adjust the lightness of the recorded image. The ink density is uniformly changed as shown in FIG. 9. "Color balance" means the conversion of the ink density for each color, independently.

(5) Tone Gradation Process

The tone gradation process effects the simulation of the halftone gradation so that it can be represented by the number of dots per unit area, corresponding to the density of the image. Here, binary data c, m, y, k are produced for the multi-level C", M", Y", K". The binary data are used as print data 308 in FIG. 3. For this method, dither method or error dispersion method or the like are known. Recently, the error dispersion method is widely used because good tone gradation can be provided without deteriorating the apparent resolution of the image.

Embodiment 1

In this embodiment, the ratio of black generation in the UCR and black generation processes, is changed in accordance with the marginal image density data.

The density data for C, M, Y, K for each pixel are determined through the UCR and black generation processes. In this embodiment, the amount deemed as the UCR component in the UCR process, is changed in accordance with the image density data in the marginal area. More particularly, au and as in equation (2) are a function having a parameter of marginal density data (C, M, Y).

Figure 10:
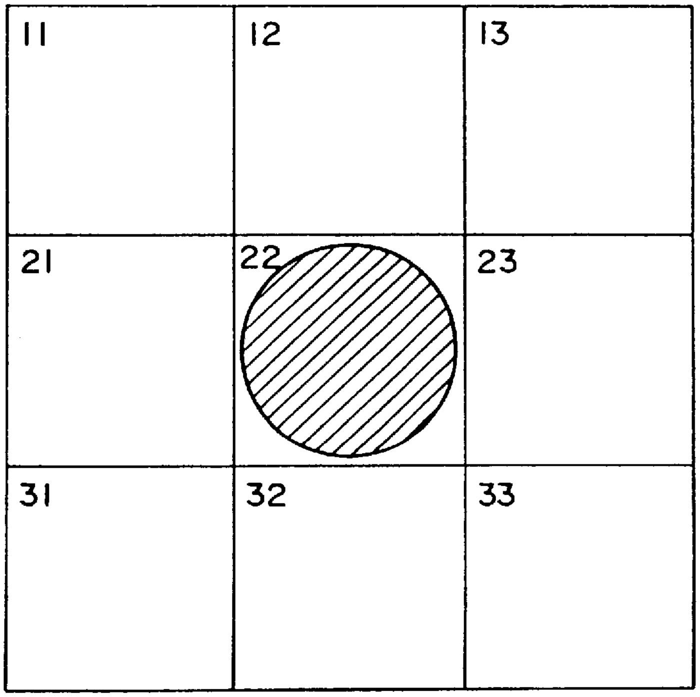
FIG. 10 illustrates a discrimination pixel and marginal pixel in Embodiment 1.

Referring to FIG. 10, a particular pixel is noted, and the process of determining the UCR amount will be described. In FIG. 10, an address 22 is a discrimination pixel. First, a density data for a pixel marginal to the discrimination pixel, the address 11, for example, in other words, C, M, Y provided by the equation (1) or (1'), are fetched. After the UCR process and black generation process, the black part is dominant when the three values are close to each other, and the color (C, M, Y) component is relatively small. When they are equal, all are replaced with black. Therefore, the black character data have the maximum density for any colors, and the densities are equal so that the data are converted to black.

In the no-data area, all the densities are 0 (white portion), and therefore, the densities are equal, but the black is not generated. If the color data represent the primary color, only one of C, M, Y exists, and therefore, no black is generated. In the case of secondary color, only two of C, M, Y exist, and therefore, the black is not generated Thus, on the basis of the density data for C, M, Y, it can be discriminated as to the pixel is black, color, or white (not to be printed).

From the foregoing, the color component of the pixel at the address 11 can be discriminated on the basis of the density data. By changing the address, another marginal pixel is discriminated on the basis of the image data. Thus, the color components in the marginal pixels are determined. Then, the amount of black generation in the discrimination pixel, that is, the proper ratio of the black generation, can be controlled properly.

Figure 11:
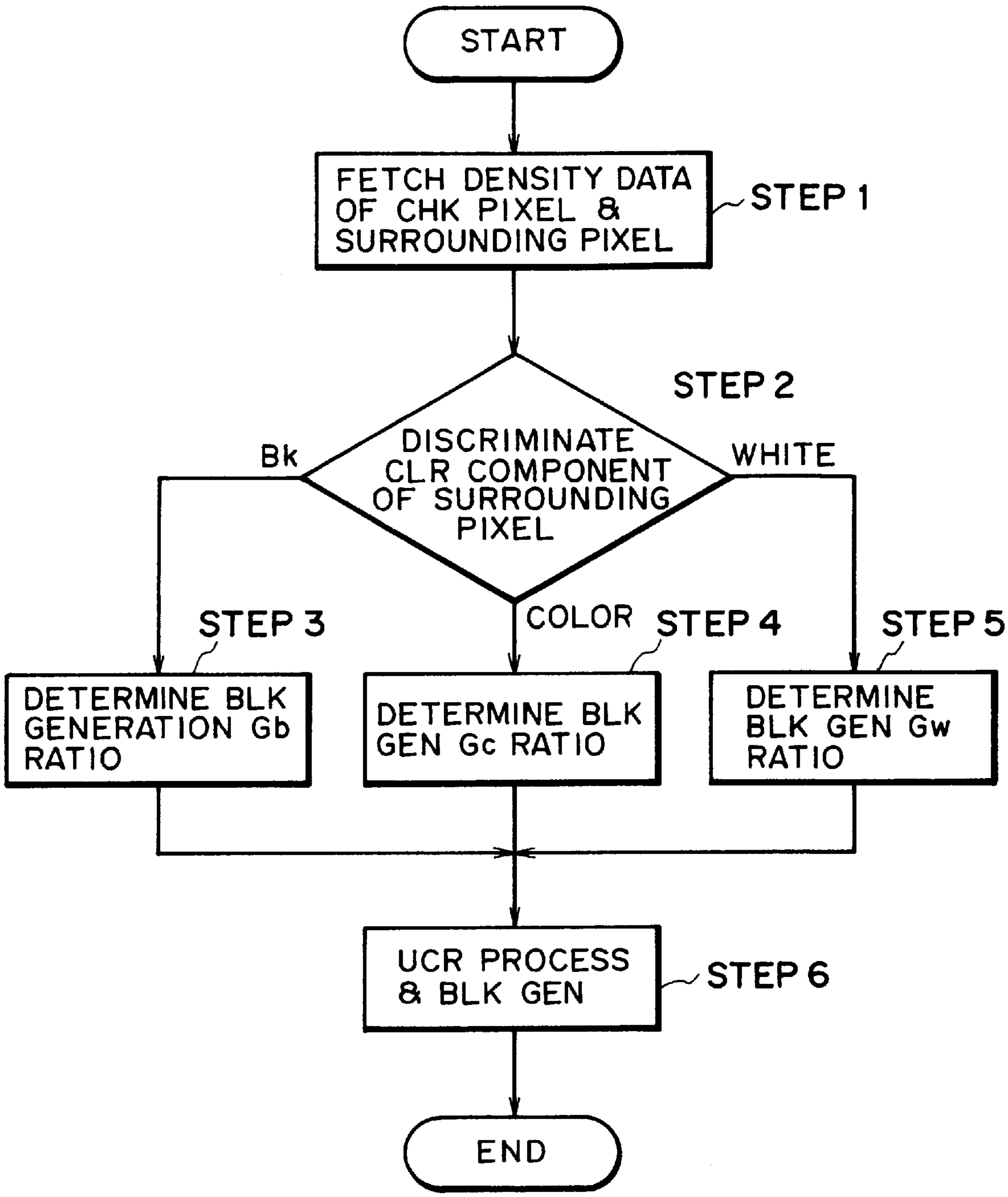
FIG. 11 shows sequential operations for changing black production amount used in Embodiment 1.

FIG. 11 shows sequential operations for changing the black generation amount for the discrimination pixel on the basis of the color component of the marginal pixels. At step 1, the density data for the marginal pixels and the discrimination pixel are read. The degree of the reading can be selected in accordance with the area to be discriminated, but at least one marginal pixel can be discriminated.

At step 2, the discrimination is made as to the color component of the marginal pixel. It is determined from the density data as to how to the color components of the pixel are changed through the UCR and black generation processes. At steps 3–5, the ratio of the black generation amount G is determined in accordance with the color components. In FIG. 11, there are a black part, white part and color part (three in total). If at least one color pixel exists in the marginal pixels, Gc is selected (step 4). If the marginal pixels do not include any color pixel but include at least one black pixel, Gb is selected (step 3). If there is no color pixel nor black pixel, It is deemed as a white part, and Gw is selected (step 5). The UCR process and black generation process are executed in accordance with the ratio of the black generation amount determined in steps 3–5 (at step 6).

Here, Gb represent the maximum level (conversion all to black). By doing so, the quality of print of independent black character or the like is not deteriorated. Gc is changed in accordance with the amount of the color pixels in the marginal area. With the increase of the color pixel amount, Gc decreases. With the decrease of the amount of the color pixels, Gc increases. In the case of Gw, the discrimination pixel stands alone, and therefore, the consideration to the color mixture with the marginal pixel is not required to be considered, and the maximum level (conversion all to black) is used.

Figure 12:
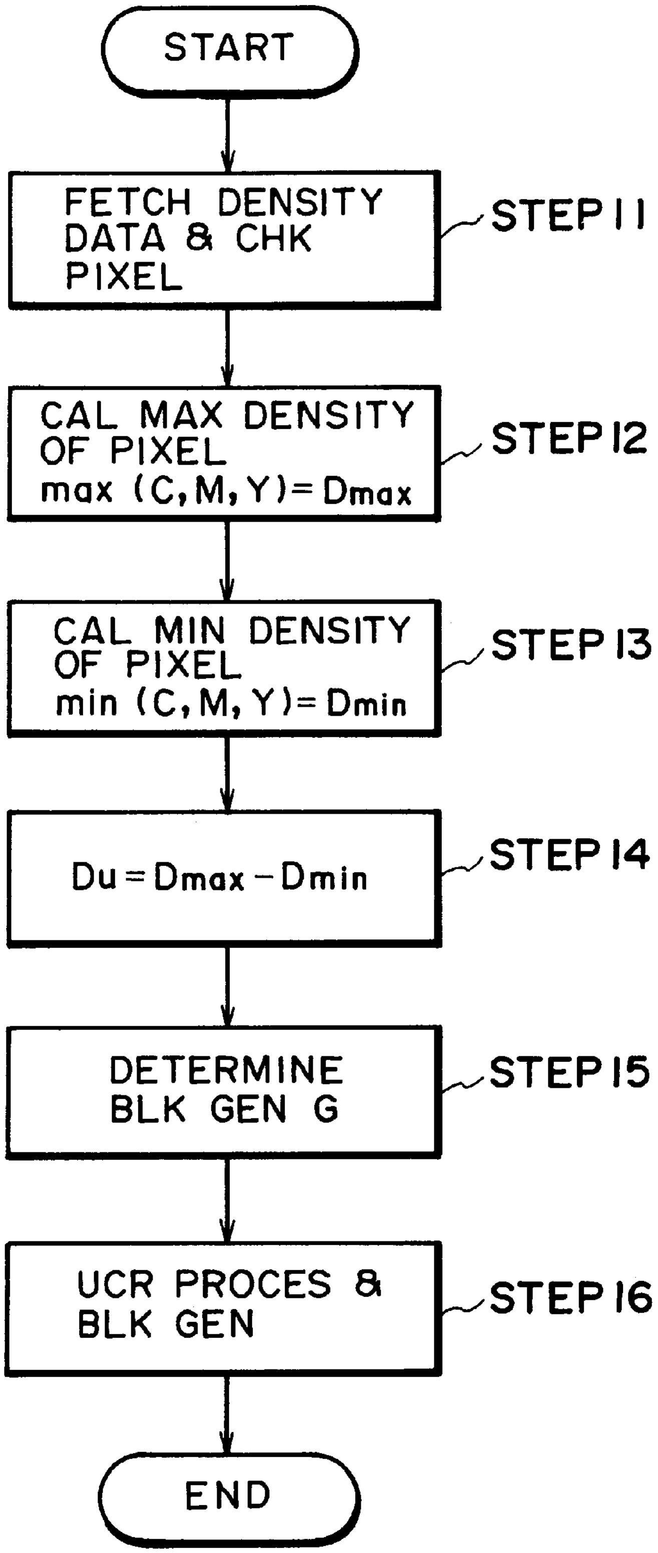
FIG. 12 illustrates sequential operations for changing black production amount incorporating specific color component discrimination used in Embodiment 1.

Referring to FIG. 12, the discrimination of the marginal pixel (whether black or color) will be discriminated.

At step 11, the density data for the discrimination pixel and the marginal pixel is read. The degree of reading can be selected in accordance with the area to be discriminated. At least one pixel datum can be discriminated. At step 12, the maximum density max (C, M, Y)=Dmax is calculated on the basis of the density of each pixel. At step 13, the minimum density min (D, M, Y)=Dmin is calculated on the basis of the density of each pixel. From Dmax and Dmin, the color components of the pixel are determined. At step 14, the difference between Dmax and Dmin is calculated as Dij. At step 15, black generation amount G is determined on the basis of Dij using a table which will be described hereinafter. At step 16, the UCR process and black generation process are carried out, thus determining the color components of the discrimination pixel.

Referring to FIG. 13, the description will be made as to a relationship between Dmax and Dmin. FIG. 13 shows the ratios of black and color in a pixel for which the density is represented in 8 gradations (an increment of 12.5%, although it is rounded in the Figure). Larger Dmax and Dmin mean higher density. With increase of Dmax, the black or color component is high, and on the contrary, smaller Dmax means decrease of black and color components toward white. With increase of Dmin, the black component increases, and the black component decreases with decrease of Dmin.

Accordingly, in FIG. 13, the color component increases toward upper right portion, that is, the color component increases with increase of the difference between Dmax and Dmin. With the decrease of the difference between Dmax and Dmin, that is, with approaching to 0, the color component decreases. Thus, the color component of the pixel can be determined on the basis of Dij which is the difference between Dmax and Dmin.

FIG. 14 shows a table corresponding to Dij. The values given in this Figure are black generation amount G. The table is used in step 15 in FIG. 12 to determine the amount of black generation. In this embodiment, the table is in the form of a two-dimensional table (Dmax and Dmin). However, for the purpose of simplification, the table may contain only one parameter, i.e., Dij. As described hereinbefore, the color component increases with increase of Dij, and the color component decreases with decrease thereof.

In practice, the discrimination is carried out on the basis of a plurality of marginal pixels. First, the density data (C, M and Y) at the address 11 which is a pixel marginal to the discrimination pixel., are fetched, and the maximum level and the minimum level thereof are determined. Then, a difference is determined from the maximum level to the minimum level, and the difference is D11. As will be understood from equation (5), a difference between the maximum and the minimum in the marginal dots are determined:

$$
\begin{aligned}
D11&=\max(C11, M11, Y11)-\min(C11, M11, Y11)\\
D12&=\max(C12, M12, Y12)-\min(C12, M12, Y12)\\
D13&=\max(C13, M13, Y13)-\min(C13, M13, Y13)\\
D21&=\max(C21, M21, Y21)-\min(C21, M21, Y21)\\
D22&=\max(C22, M22, Y22)-\min(C22, M22, Y22)\\
D23&=\max(C23, M23, Y23)-\min(C23, M23, Y23)\\
D31&=\max(C31, M31, Y31)-\min(C31, M31, Y31)\\
D32&=\max(C32, M32, Y32)-\min(C32, M32, Y32)\\
D33&=\max(C33, M33, Y33)-\min(C33, M33, Y33) \qquad (5)
\end{aligned}
$$

The values Dij obtained by the equation (5) correspond to step 14 in FIG. 12. The black generation amount of the discrimination pixel is determined on the basis of Dij, wherein the black generation amount is determined at step 15 in FIG. 12 using the pixel having the largest color component, i.e., the largest Dij.

By doing so, a pixel in contact with at least one color pixel, the black generation amount is determined on the basis of the color component of the color pixel. Therefore, the optimum black generation amount can be determined for each pixel such that the color mixture is not a problem at the boundary between the color and the black and such that the density of the black characters or the like is not lowered.

As described in the foregoing, for each pixel, the optimum black generation amount is determined on the basis of the color component of a marginal pixel discriminated from the color density of the marginal pixel. Since the determination is made on the basis of the multi-level information, the color mixture can be suppressed because the black is generated so that the color tone is not steeply changed when the black image area is recorded in contact with the color image area. In addition, for the usual black image area, the black ink producing less feathering can be used. Thus, high quality black record and high quality color record can be simultaneously accomplished.

Embodiment 2

Figure 15:
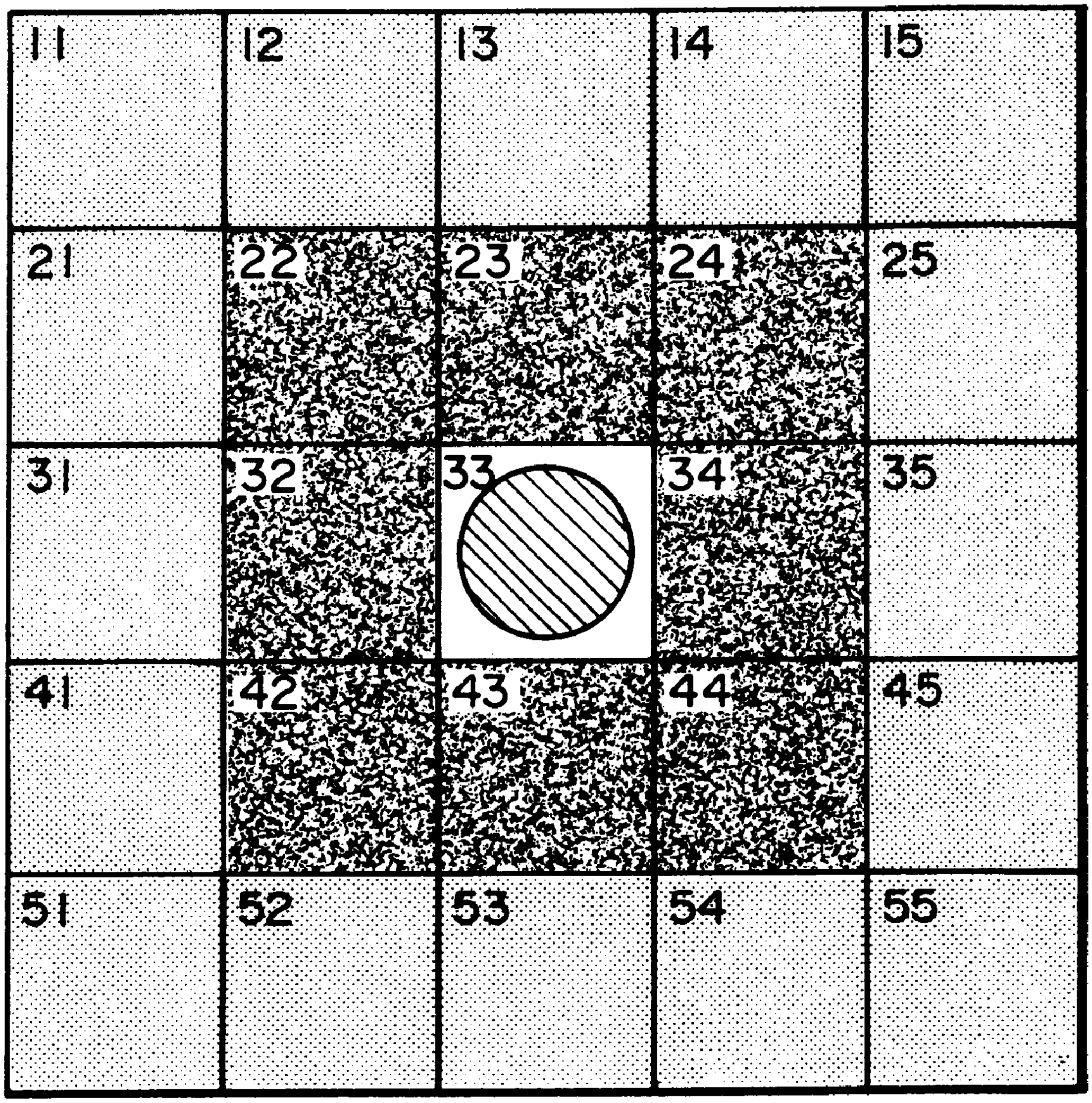
FIG. 15 is an illustration of a discrimination pixel and marginal pixel in Embodiment 2.

In this embodiment, the black generation amount for the discrimination pixel is changed in accordance with the color component of the marginal pixel similarly to Embodiment 1, but additionally, the degree of influence is changed on the basis of the distance between the discrimination pixel and the marginal pixel in this embodiment. FIG. 15 shows a relationship between the discrimination pixel and the marginal pixel. Address 33 has the discrimination pixel. Some marginal pixels are discriminated, but the degree of influence of the color component is changed depending on the distance from the discrimination pixel. For example, in FIG. 15, the degree of influence by the marginal pixel 1 is 100%, and the degree of influence of the marginal pixel 2 is 50%.

Referring to FIG. 12, the description will be made in more detail. At step 11, the density data of the discrimination pixel and the marginal pixels are read. Subsequently, at step 12, the maximum density max(C, M, Y)=Dmax is calculated from the density data of the pixels. At step 13, the minimum density min(C, M, Y)=Dmin is calculated from the densities of the pixels. The color component of the pixel is discriminated from Dmax and Dmin. At step 14, a difference between Dmax and Dmin is calculated as Dij.

For the marginal pixel 1, the values of D22, D23, D24, D32, D34, D42, D43 and D44 are used without change. For the marginal area 2, halves of D11, D12, D13, D14, D15, D21, D25, D31, D35, D41, D45, D51, D52, D53, D54 and D55 are used. The highest Dij among them is used to determine the black generation amount G with a table which will be described hereinafter, at step 15. At step 16, the UCR process and black generation process are carried out to determine the color component of the discrimination pixel.

In this embodiment, the marginal pixel is divided into two areas. More effectively, it may be divided into a larger number of areas. In such a case, the degrees of influence are changed at a larger number of steps in accordance with the distance between the discrimination pixel and the marginal pixel, by which the UCR process and the black generation process are carried out more effectively.

As described hereinbefore, according to this embodiment of the present invention, the degree of influence of the marginal pixels can be changed, and the black generation amount is changed in accordance with the color components of the marginal pixels, the color tone change at the boundary between the color and the black can be smoothed. Therefore, the amount of black generation can be more effectively determined in terms of the color mixture or the like at the boundary. Similarly to the first embodiment, for the usual black image areas, a black ink producing less feathering can be used, so that both of the high quality black recording and the high quality of the color recording can be accomplished simultaneously.

Embodiment 3

In this embodiment, after the UCR process and the black generation process are carried out, the black is substituted by color in accordance with the marginal pixel.

In this embodiment, in order to assure the prevention of the mixture between the color and the black at the boundary therebetween, the UCR and black generation processes are carried out, and thereafter, the black data are re-changed to color data. In this embodiment, the amount of black is adjusted after the color components are determined, and therefore, the color density is not influenced at the boundary between the color and the black, so that the amount of black can be assuredly limited at the boundary.

Figure 16:
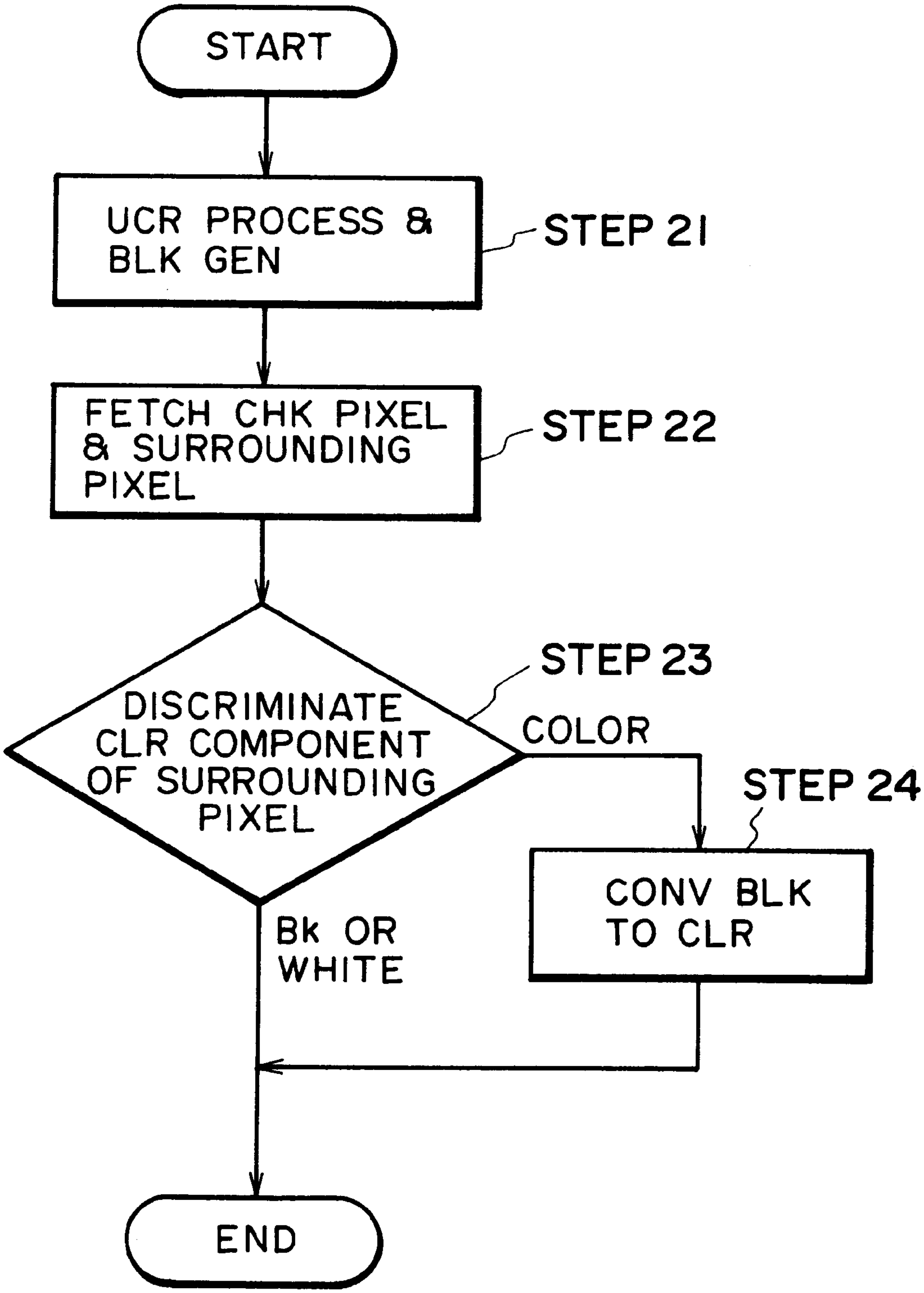
FIG. 16 illustrates sequential operations for converting black to color in Embodiment 3.

Referring to FIG. 16, the discrimination process after the UCR and black generation processes will be described. At step 21, the UCR process and black generation process are carried out to determine the color components for the respective pixels. At step 22, the density data of the discrimination pixel and the marginal pixels are read. At step 23, the color components of the marginal pixels are discriminated. If there is no color, the color conversion from the black is not carried out, and this sequence ends. If at least one color is in the marginal pixels, the black color is converted. At step 24, the black is converted to color, but it is a possible alternative that the conversion amount may be predetermined, and all the black is converted to color (C, M, Y). Further alternatively, only a certain percentage, for example, 50% is changed to color. As a yet further alternative, the conversion amount may be changed in accordance with the color components of the marginal pixels. Combination with the second embodiment is a still possible alternative by which the amount of conversion from the black to the color is determined on the basis of the color components of the plurality of marginal pixels.

As described in the foregoing, after the UCR process and black generation process, the black is converted to the color in accordance with the color component of the marginal pixels, by which the defects attributable to the mixture between black and color at the boundary can be controlled.

Embodiment 4

Figure 17:
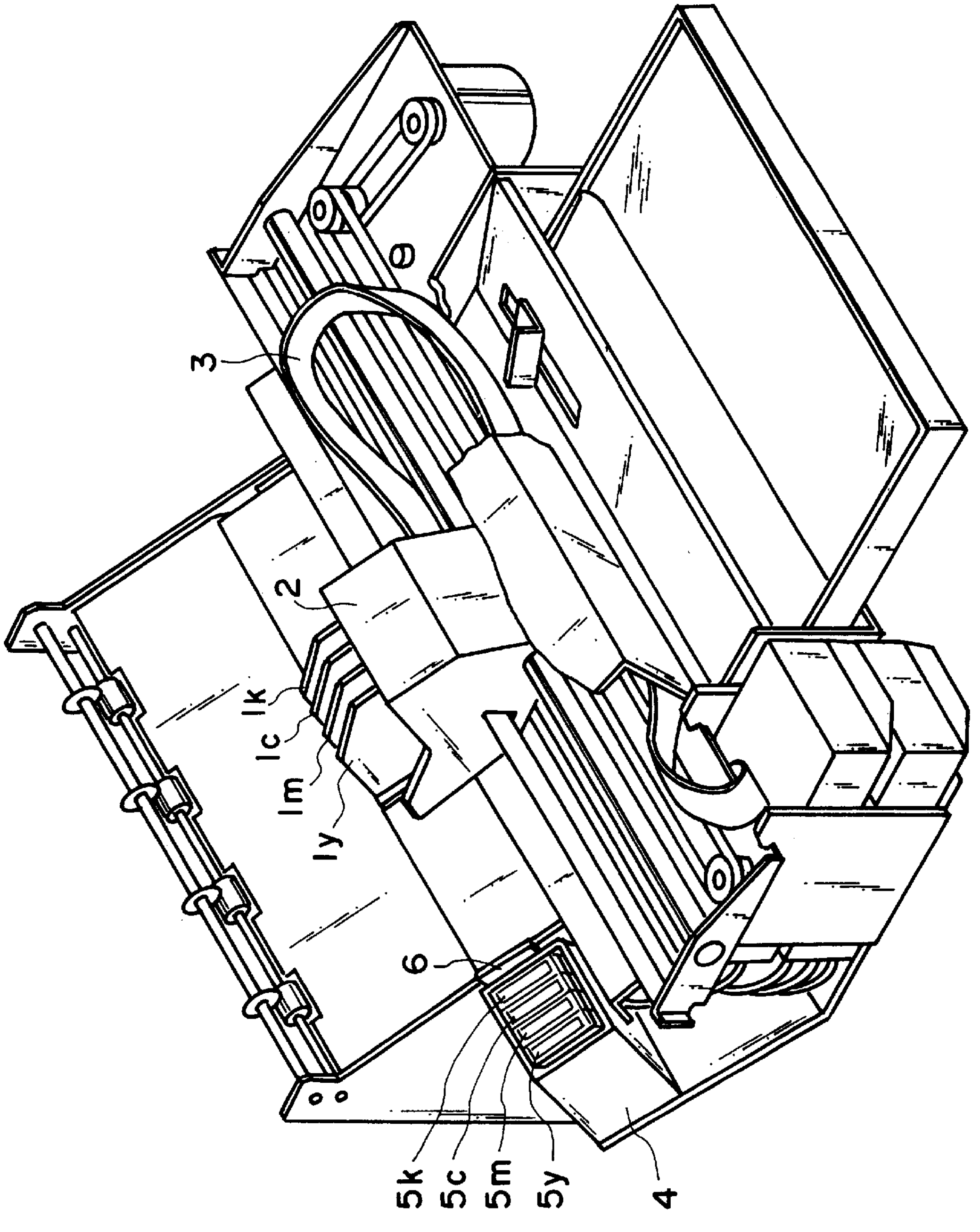
FIG. 17 is a perspective view of another ink jet recording apparatus to which Embodiment 4 of the present invention is applicable.

FIG. 17 schematically shows a color ink jet printer to which the present invention is applicable. It comprises a yellow ink recording head 1*y*, an magenta ink recording head 1*m*, a cyan ink recording head 1*c*, a first black ink recording head 1*b*, a second black ink recording head 1*k*. It further comprises a carriage 2 for carrying the recording heads, a flexible cable 3 for feeding the electric signals from the main assembly of the printer to the recording heads, a cap unit 4 having ejection recovery means, capping members 5*y*, 5*m*, 5*c*, 5*k* for the recording heads 1*y*, 1*m*, 1*c*, 1*k*, and a wiper blade 6 of rubber material.

The structure of the nozzles of the recording heads 1*y*, 1*m*, 1*c* and 1*k* are fundamentally the same as those of the recording head 102. Each recording head has 128 ejection outlets, and approx. 40 ng ink is ejected through each of the recording heads 1*y*, 1*m* and 1*c*, and approx. 80 ng ink is ejected from the nozzle of the recording head 1*k*. For recording heads 1*y*, 1*m* and 1*c*, the ink having higher penetration speed into the recording sheet is used, and ink having low penetration speed into the recording sheet is used for the recording head 1*k*.

The present invention is applicable to such a printer. In this embodiment, the same size recording heads are arranged in parallel, and therefore, the recording speed is higher.

In the foregoing embodiments, the black generation amount and the black amount are changed in relation to the UCR. and black generation processes. However, binary processing is usable. With the binary process in the tone gradation process 505 in FIG. 4, it is possible that the binary process is not effected independently for respective colors, but the color components of the marginal pixels are discriminated similarly to the UCR process and the black generation process, and the binary process is changed in accordance with the color component of the marginal pixel. For example, the binary masking is changed in accordance with the color component of the marginal pixel, for example.

Since the process is carried out on the basis of the multi-level information, the defect at the boundary between the black and color can be limited similarly to Embodiments 1, 2 and 3, so that the smooth change in the color tone is possible at the boundary.

According to Embodiments 1–4, the black is not substituted by PCBk on the basis of detection at the boundary, but before the boundary is formed, that is, before the binary process, the ratio of production of the multi-level black image data is changed in the UCR process for generating Bk data from C, M, Y color data. Therefore, at the interface between the color image area and the black image area, the smooth tone change is accomplished without sudden tone change, and therefore the defect in the boundary is less conspicuous.

By doing so, high record quality with less feathering in the black image region is accomplished, and the color mixture is less at the boundary between the black and color. Therefore, high quality black record and high quality color record are simultaneously accomplished.

Embodiment 5

Figure 19:
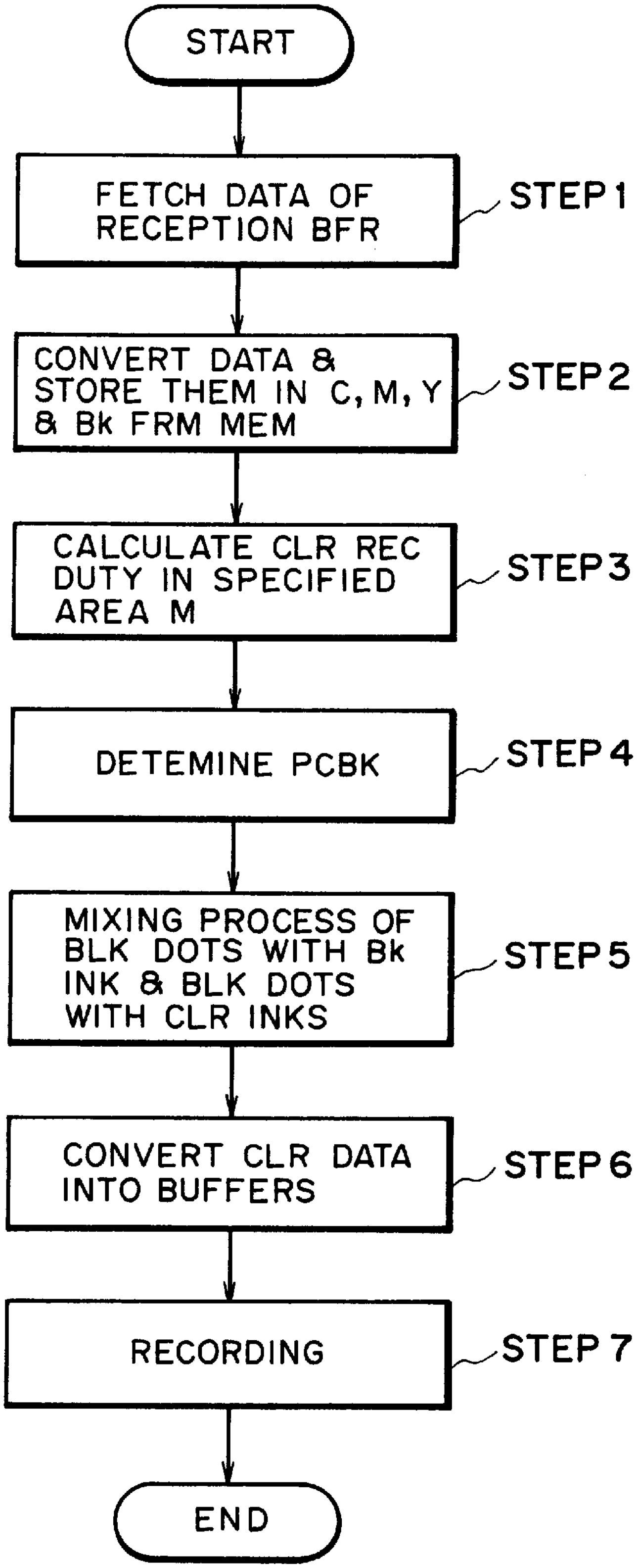
FIG. 19 is a flow chart of operations in Embodiment 5.

FIG. 19 is a flow chart of fifth embodiment.

Figure 20:
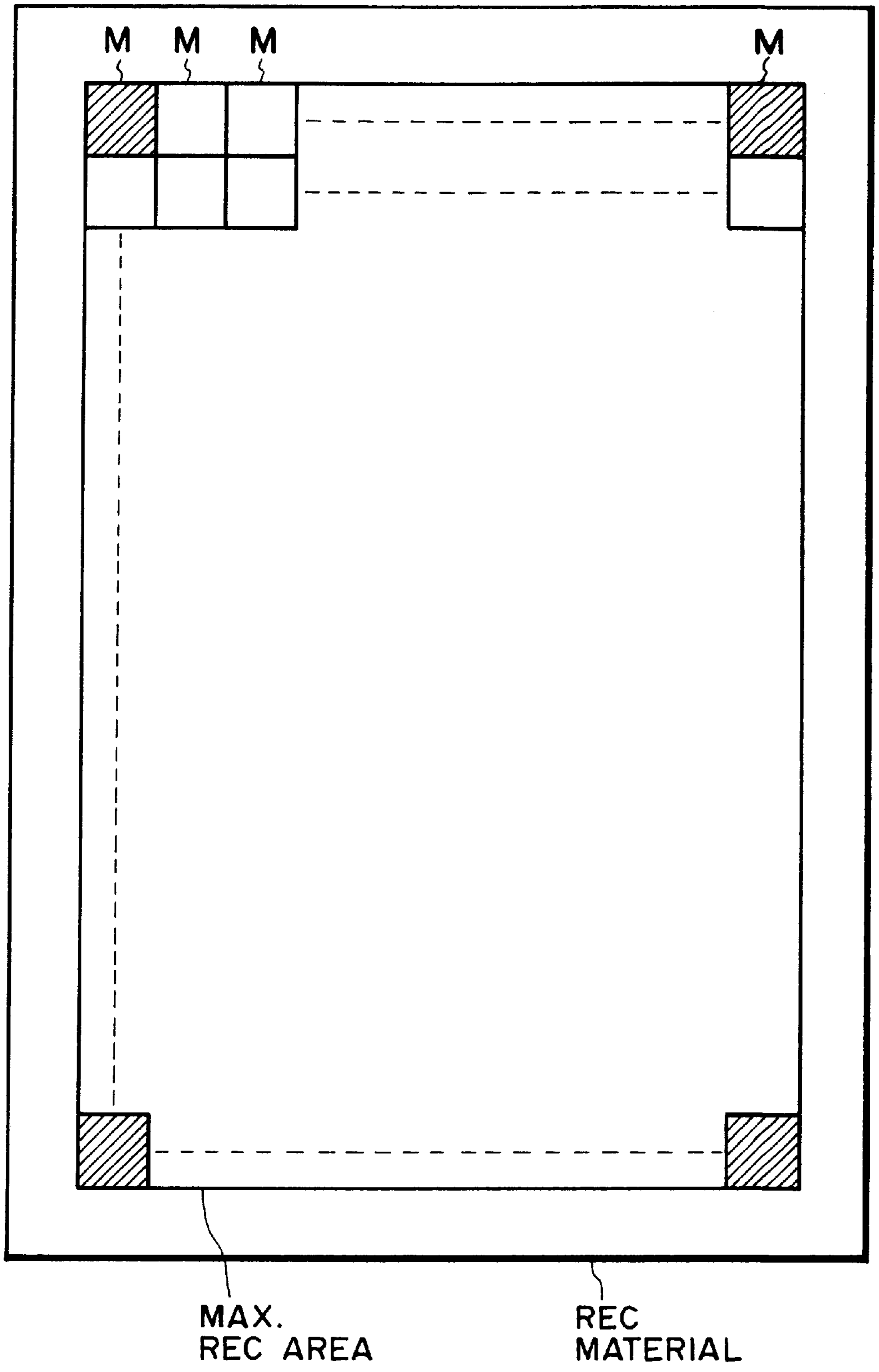
FIG. 20 shows a relationship between a recording area and a specified area in Embodiment 5.

At step 1, data is transferred from host computer 301, and the data stored in the reception buffer 307 are read by the system controller 301. The data read at step 1 are stored for each color in C, M, Y and Bk frame memories 308, at step 2. At step 3, the area of record is divided into specified areas M, and in the areas M, the color recording duty is calculated. More specifically, as shown in FIG. 20, the record data for one page of A4 size stored in the frame memory, are divided into specified areas M comprising 16 pixels (4×4 dots), and the numbers of C, M, Y record pixels each specified area M are counted, and the color dot duty (color pixel number/(16—black pixel number)), is calculated. At step 4, in accordance with the duty of the color dot, it is determined how much black record pixel is added to PCBK for the black data in the specific region. An example will be described.

| | |
|---|---|
| color duty < 25% | BK |
| 25% ≦ color duty < 50% | PCBk1 |
| 50% ≦ color duty < 75% | PCBK2 |
| 75% ≦ color duty | PCBk3 |

On this example, the PC8k pattern is shown in accordance with the color duty. An example of the pattern will be described hereinafter.

In accordance with the PCBk determined at step 4, the mixture process for mixing the black dots by Bk ink and the PCBk dots by the color inks, is carried out. For example, when the color duty is less than 25%, the black pixel is produced only by black ink. When the color duty is not less than 25% and less than 50%, the color data conversion is effected using a mask PCBk 1 shown in FIG. 21A. When the color duty is not less than 50% and less than 75%, a mask PCBk 2 shown in FIG. 21B is used. When the color duty is not less than 75%, a mask PCBk 3 shown in FIG. 21C is used. At step 6, the data for Bk, C, M, Y are converted and stored to the buffers for the respective colors. At step 7, the recording operation is carried out in the known manner.

By doing so, the ratio of PCBk in a black pixel is increased with the increase of the color duty around the black pixel, and when the color duty around the black pixel is low, the black pixel is recorded only by the black ink. In other words, the ratio of the black ink is reduced when the color duty is large, which means a higher possibility of color mixture, by which the mixture or seeping between black image and color image is reduced, and when the color duty is low, the black ink is used as much as possible, thus the non-naturality resulting from the change of the color tone is reduced.

This process is carried out by software in the system controller 301. The process is not limited to this type, and for example, a hardware electric circuit can be used for the purpose of higher process speed.

In this embodiment, the pixel pitch P is approx. 70.56, and the record density is 360 dpi. Therefore, the record pixel for recording A4 full size is approx. 2600 in the lateral direction, and approx. 3600 in the longitudinal direction. The number of specified areas M is approx. 650 in the lateral direction and approx. 900 in the longitudinal direction since each area comprises 4×4 pixels.

The ratio of the black ink pixel in the PCBk is changed at the threshold level of color duty of 25%, but this is not limiting in this invention. In this embodiment, a frame buffer covering one full page is used, but the present invention is applicable when a line buffer in place of the frame buffer is used.

In this embodiment, as described in the foregoing, the color duty in the area marginal to the black image is discriminated, and in accordance with the result of the discrimination, the ratio of the black ink in the PCBk constituted by a plurality of color inks, and therefore, it is possible that the tone change by the PCBk is less conspicuous. By doing so, the good record quality with less feathering in the black region is realized, and the record quality with less ink mixture between black and color is accomplished. Accordingly, the high quality black record and high quality color record are accomplished simultaneously.

Embodiment 6

In Embodiment 5, the recording area is divided into specific areas M. However, as shown in FIG. 22, if the boundary between adjacent specific areas M is also a boundary between black pixel and color pixel, the area containing only black pixels is discriminated as having low color duty, and therefore, the black data are all for black ink. In such a case, it is desirable that the information around the specific area M is incorporated.

Figure 23:
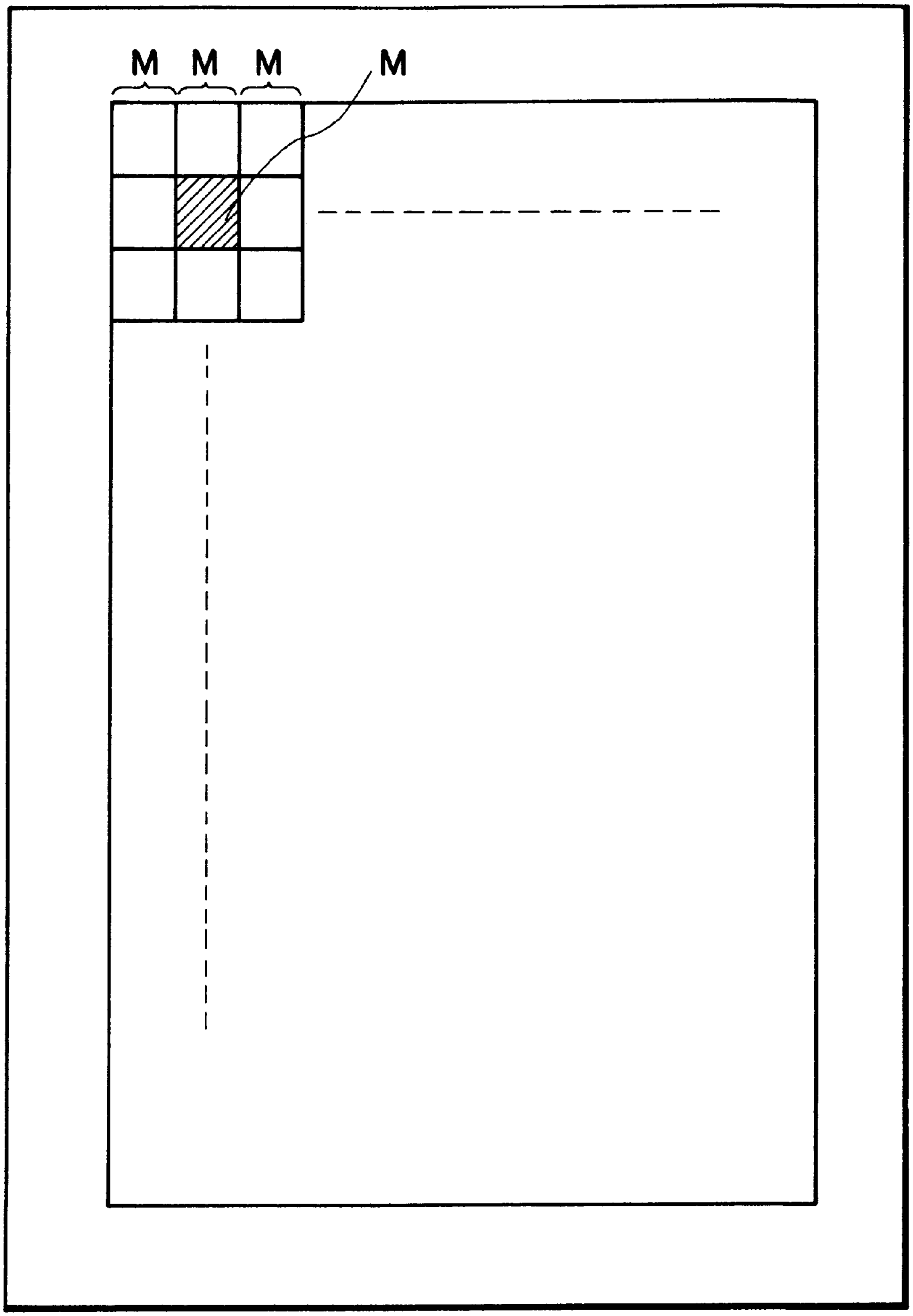
FIG. 23 shows a relationship between a recording area and a specified area in Embodiment 6.

An example is shown in FIG. 23, in which wider specified areas are determined (containing 9 specified areas M, for example), and the PCBk in the specified area M is determined in accordance with the color duty in the wide area. The time required for the processing is longer than in Embodiment 1, but the better processing is assured.

By doing so, the determination is made taking the states in the marginal area into account, and therefore, proper PCBk record pattern is determined even in the case of the record image shown in FIG. 22, and therefore, the tone change due to the PCBk is much less remarkable, and the color mixture can be avoided.

Embodiment 7

Figure 24:
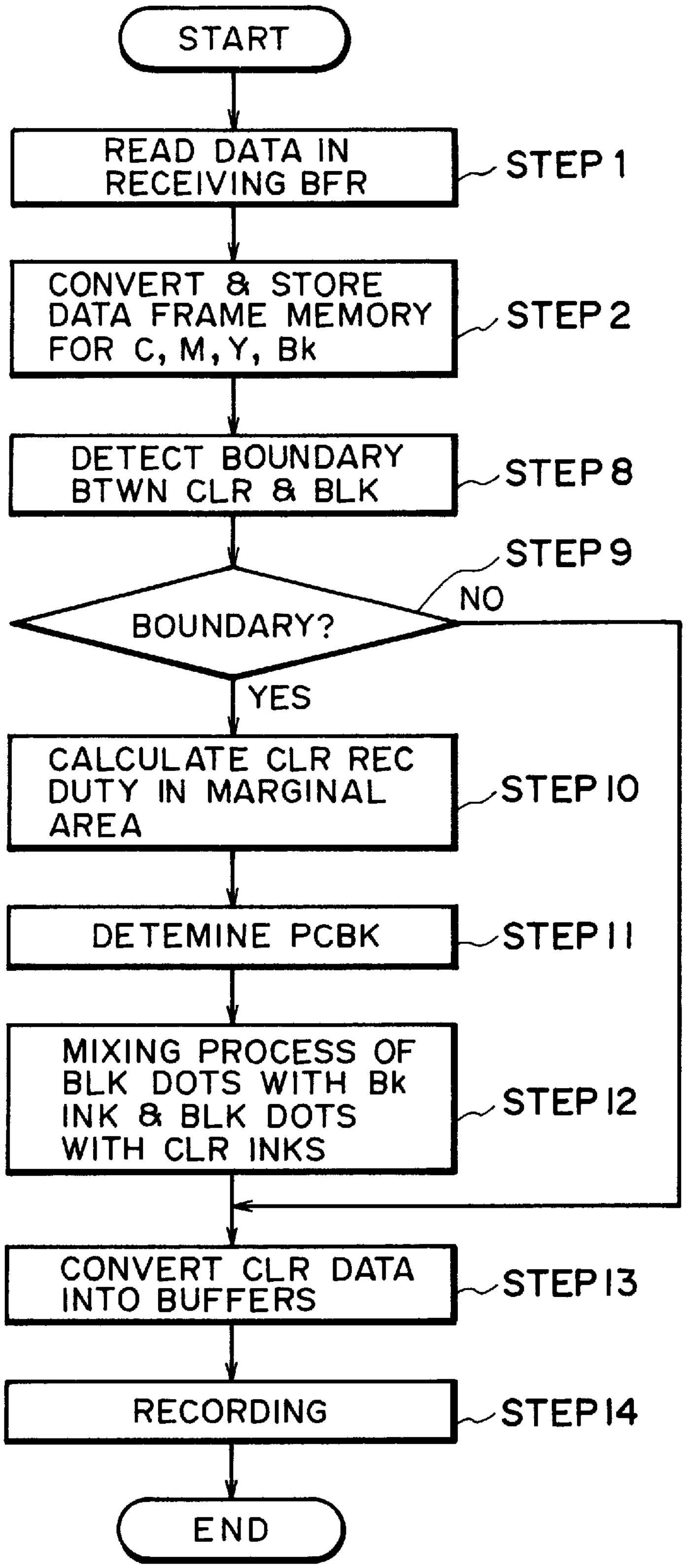
FIG. 24 is a flow chart of operation in an apparatus of Embodiment 7.

FIG. 24 is a flow chart illustrating Embodiment 7. At step 1, the data stored in the reception buffer 307 are processed by the system controller 301. The data is transferred from the host computer 306, and the stored data is read out. At step 2, the read data are converted and stored for each color in respective frame memories 308 for C, M, Y, Bk. Subsequently, the boundary between the color image data and the black image data is detected. At step 9, the black data is noted, and the discrimination will be made as to whether the black data are directly adjacent to the color data. If so, step 10 is executed. If not, step 13 is executed. At step 10, the boundary pixel is noted, and color duty is calculated for 7×7 specified areas. At step 11, the PCBk for the noted pixel is determined in accordance with the duty, and the information is temporarily stored in the buffer. At the next step 12, a predetermined PCBk mask is used in accordance with PCBk determined similarly to Embodiment 1 to effect the mixing process by which black dots by the black ink and the black dot by the color inks are mixed.

At step 13, the Bk, C, M and Y data are stored in the buffers for the respective colors, and at step 14, the known recording operation is carried out.

Figure 25:
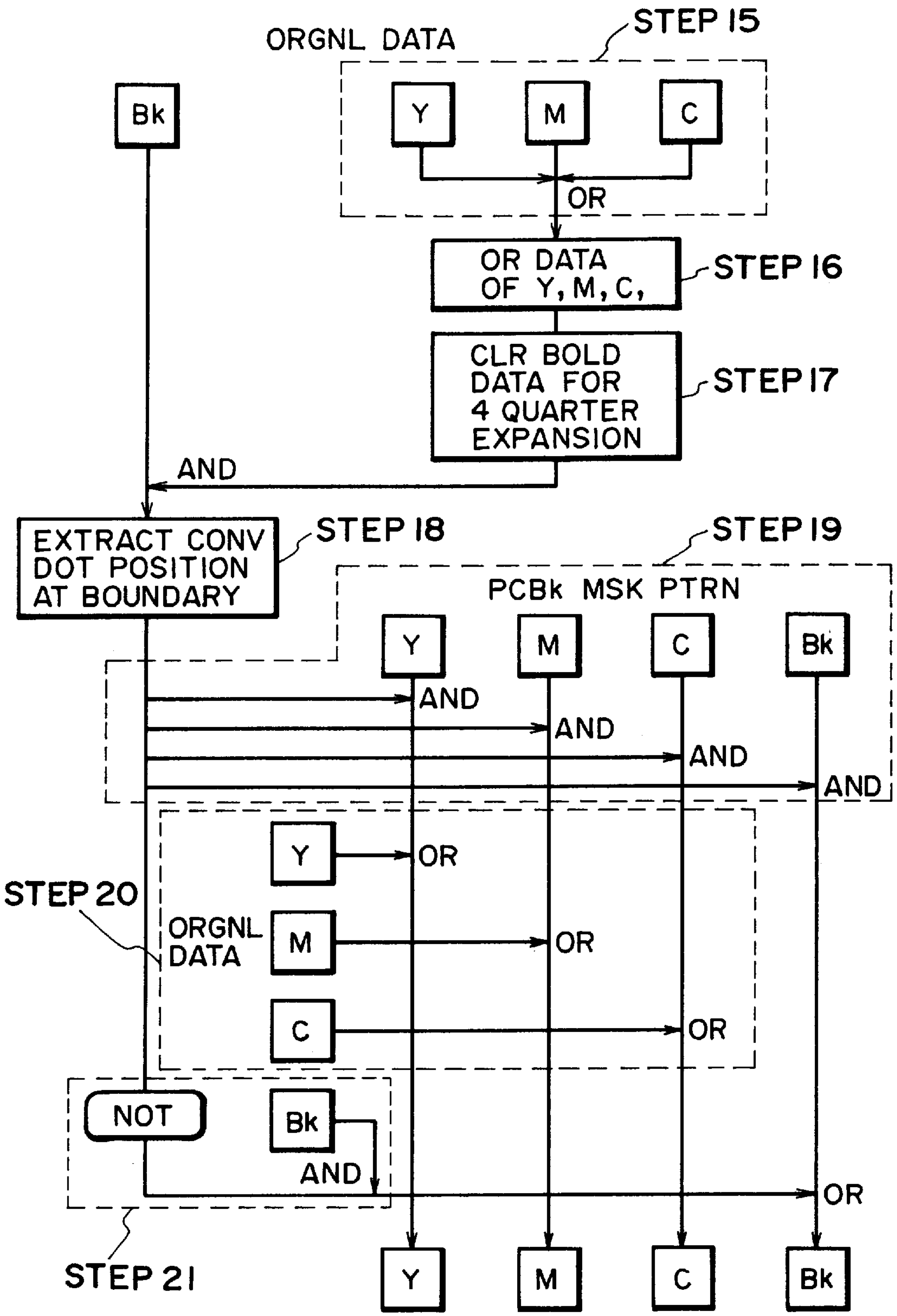
FIG. 25 is an illustration of a boundary detection sequence and a PCBk substitution sequence.

Referring to FIG. 25, the description will be made as to a boundary detection sequence for detecting black image area in contact with the color image area (step 3) and a process sequence for the Bk ink dot and the black dot by color inks.

At step 15, Y, M or C data is selected from original image data (Bk, Y, M, C) to be recorded. At step 16, the selected data are used as color data and temporarily stored in the buffer. At step 17, bold data are produced by expanding by 4 bits in the vertical and horizontal directions, and the resultant data are stored in the buffer. The operation is carried out by drug shift which is a function of the gate array. While shifting the address, the original data or current data are selected, and the original data are bolded in the shift direction. By effecting these operations in the upperward, bottomward, leftward and rightward directions, by which color data bolded in the four directions are generated.

At step 18, the bold data and black original data are passed through AND gate, and the data are extracted as Bk data for PCBk conversion at the boundary.

At step 19, the extracted conversion data and PCBk mask pattern (conversion mask) set for the respective colors are passed through AND gate to generate the data to be added for the PCBk process. At step 20, the PCBK data for respective colors and original data are passed through an OR gate to produce final image data. Since the PCBk is produced Bk data, and therefore, the PCBk conversion data are extracted from the original data. At step 21, the PCBk data are reversed, and passed through an AND gate with the Bk original data, thus removing the PCBk data from the original data. Furthermore, the data are passed through an OR gate with the PCBk data for Bk, thus producing final Bk image data.

According to this sequential operation, the amount of bold for the color data is changed, by which the width of PCBk conversion can be controlled. By effecting this sequential operation at multi-stage, the direction at the boundary between the black image area and the color image area can be detected. In addition, the boundary between the color and black are detected independently from each other, so that the proper PCBk can be selected for the respective colors.

With the structure described above, proper PCBk can be determined without color mixture and with less remarkable tone change due to the use of the PCBk.

According to this embodiment, the boundary between the color and black where the color mixture or seeping easily occurs, is detected beforehand, and is processed. Therefore, the original black data can be converted efficiently to the PCBk data.

In the foregoing Embodiments 5–7, the recording head has one line of ejection outlets for ejecting different color inks, but the present invention is not limited to this type. For example, a plurality of same size recording heads for ejecting different color inks may be arranged laterally on a carriage, as described in Embodiment 4. The carriage is moved in a direction along which the heads are arranged. In this case, since the same size recording heads are arranged in parallel, the recording speed is increased.

When the PCBk conversion is effected at the boundary between the color image area and the black image area, the proper PCBk conversion is selected in accordance with the color image duty. By doing so, the color mixture and the tone change due to the PCBk can be minimized. Thus, the black image recording can be carried out with less feathering, and the mixture between black and color can be minimized, simultaneously. In the foregoing embodiments, the discrimination of the image, processing, the conversion of the image data, the substitution of the data, are carried out all by the controller in the recording apparatus on the basis of the data received by the host computer, but the present invention is not limited to this system.

For example, the above-described control and processing are all carried out by an external apparatus such as a printer driver, and the image record data are received after the substitution process for the pixels, are received. In many cases, the external device connected to the recording apparatus is a computer in most cases, but the processing capacity of the CPU and the RAM capacity are better in the host computer.

Alternatively, the discrimination of the image data may be carried out by the host computer, and the conversion of the image data may be carried out by the printer (function showing).

The recording head described in the foregoing uses electrothermal transducers to produce a bubble in the ink to eject the ink. However, the present invention is also applicable to an ink jet recording method using electromechanical (piezoelectric) elements.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressurizing or suction means, and, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be heads corresponding to a plurality of ink materials having different recording colors or densities. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is applied. The present invention is applicable to other types of ink. In one of them, the temperature rise due to the thermal energy is positively prevented by consuming it for the state change of the ink from the solid state to the liquid state. Another ink material is solidified when it is left unused, to prevent the evaporation of the ink. In either of the cases, upon the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording method using black ink and a plurality of inks having different colors, which have ink penetration properties different from that of said black ink, said method comprising the steps of:

receiving a multi-level color recording datum corresponding to a plurality of colors;

discriminating a color component of a pixel around a discrimination pixel on the basis of the multi-level color recording datum;

generating a multi-level black recording datum in accordance with the multi-level color recording datum of a discrimination pixel corresponding to the plurality of colors, wherein a ratio of generation of multi-level black recording datum is changed with a result of said discrimination step;

converting the multi-level color recording datum and the multi-level black recording datum to recording data corresponding to the color inks and the black ink; and recording a color image based on the recording data provided by said converting step.

2. A method according to claim 1, wherein in said generating step, the ratio is changed based on ratios of generations corresponding to the multi-level recording datum in a marginal pixel.

3. A method according to claim 1, wherein in said generating step, the ratio is changed based on a density of a multi-level record datum of a marginal pixel.

4. A method according to claim 1, wherein in said generating step, the ratio is changed in accordance with multi-level recording data of areas into which a marginal pixel is divided.

5. A method according to claim 1, wherein in said recording step, the color image is recorded in accordance with binary data to which the multi-level color recording datum and the generated multi-level black recording datum are converted.

6. A method according to claim 1, wherein the color inks include yellow, magenta and cyan inks.

7. A method according to claim 1, wherein the inks are ejected by thermal energy.

8. A method according to claim 1, wherein the inks are ejected by thermal energy.

9. A method according to claim 1, wherein said generating step generates the multi-level black recording datum in accordance with a mask pattern, which is selected in accordance with a result of the discrimination step.

10. A data processing method for recording with use of black ink and a plurality of inks having different colors, which have ink penetration properties different from that of said black ink, said method comprising the steps of:

receiving a multi-level color recording datum corresponding to a plurality of colors;

discriminating a color component of a pixel around a discrimination pixel on the basis of the multi-level color recording; and generating a multi-level black recording datum in accordance with the multi-level color recording datum of a discrimination pixel corresponding to the plurality of colors, wherein a ratio of generation of multi-level black recording datum is changed with a result of said discrimination step.

11. A method according to claim 10, wherein said generating step generates the multi-level black recording datum in accordance with a mask pattern, which is selected in accordance with a result of the discrimination step.

12. An ink jet recording method using black ink and a plurality of inks having different colors, which have ink penetration properties different from that of said black ink, said method comprising the steps of:

receiving a multi-level color recording datum for a predetermined discrimination pixel and a pixel around the discrimination pixel;

discriminating a color component of the pixel around the discrimination pixel on the basis of the multi-level color recording datum;

generating a multi-level black recording datum based on a multi-level color recording datum of a discrimination pixel;

converting the multi-level black recording datum generated by said generating step to the multi-level color recording datum corresponding to a plurality of colors in accordance with a result of said discriminating step; and recording a color image based on the recording data provided by said converting step, wherein a black image is formed by a plurality of multi-level color recording data resulting from said converting step.

13. A method according to claim 12, wherein in said bust converting step, an amount of conversion is changed in accordance with the multi-level color recording datum of a marginal pixel.

14. A method according to claim 12, wherein in said recording step, the color image is recorded in accordance with binary data to which the converted multi-level color recording datum and the multi-level black recording datum are converted.

15. A method according to claim 12, wherein the color inks include yellow, magenta and cyan inks.

16. A method according to claim 12, wherein said converting step converts the multi-level black recording datum in accordance with a mask pattern determined in accordance with a result of said discriminating step.

17. A data processing method for recording with use of black ink and a plurality of inks having different colors, which have ink penetration properties different from that of said black ink, said method comprising the steps of:

receiving a multi-level color recording datum for a predetermined discrimination pixel and a pixel around the discrimination pixel;

discriminating a color component of a pixel around a discrimination pixel on the basis of the multi-level color recording datum;

generating multi-level black recording datum based on a multi-level color recording datum of a discrimination pixel; and converting the multi-level black recording datum generated by said generating step to the multi-level color recording datum corresponding to a plurality of colors in accordance with a result of said discriminating step.

18. A method according to claim 17, wherein said converting step converts the multi-level black recording datum in accordance with a mask pattern determined in accordance with a result of said discriminating step.

19. An ink jet recording apparatus using black ink and a plurality of inks having different colors, which have ink penetration properties different from that of said black ink, said apparatus comprising:

discriminating means for discriminating a color component of a pixel around a discrimination pixel on the basis of a multi-level color recording datum corresponding to each pixel;

determining means for determining a ratio of a black generation for the discrimination pixel in accordance with the color component discriminated by said discriminating means;

first generating means for generating a black component for the discrimination pixel based on the ratio of the black generation determined by said determining means;

second generating means for generating driving data for ejecting the black ink and color inks based on the black and color components; and ejecting means for ejecting the black ink and the color inks based on the driving data.

20. An apparatus according to claim 19, wherein the color inks include yellow, magenta and cyan inks.

21. An apparatus according to claim 19, wherein the color and black inks are ejected from yellow, magenta, cyan and black recording heads.

22. An apparatus according to claim 21, further comprising a carriage for carrying said recording heads.

23. An apparatus according to claim 21, further comprising feeding means for feeding a recording material to a position of recording by said recording heads.

24. An apparatus according to claim 19, wherein said recording apparatus is a copying machine.

25. An apparatus according to claim 19, wherein said recording apparatus is a facsimile machine.

26. An apparatus according to claim 19, wherein said recording apparatus is a terminal machine of a computer.

27. An apparatus according to claim 19, wherein the inks are ejected by thermal energy.

28. An apparatus according to claim 19, wherein said determining step means determines a pattern for generating the black component of the discrimination pixel based on a multi-level recording datum of a pixel around the discrimination pixel, and a ratio of generation of black recording datum is changed in accordance with the pattern.

29. An ink jet recording apparatus using black ink and a plurality of inks having different colors, which have ink penetration properties different from that of said black ink, said apparatus comprising:

first generating means for generating a multi-level black recording datum from a multi-level color recording datum of a discrimination pixel;

discriminating means for discriminating a color component of a pixel around a discrimination pixel on the basis of the multi-level color recording datum;

converting means for converting the multi-level black recording datum generated by said first generating means to the multi-level color recording datum corresponding to a plurality of colors in accordance with a result of said discriminating means;

second generating means for generating recording data corresponding to the color inks and the black ink based on the multi-level color recording datum and the multi-level black recording datum; and ejecting means for ejecting the black ink and the color ink based on the data generated by said second generating means, wherein a black image is formed by a plurality of multi-level color recording data converted by said converting means.

30. An apparatus according to claim 29, wherein the color inks include yellow, magenta and cyan inks.

31. An apparatus according to claim 29, wherein the color and black inks are ejected from yellow, magenta, cyan and black recording heads.

32. An apparatus according to claim 31, further comprising a carriage for carrying said recording heads.

33. An apparatus according to claim 31, further comprising feeding means for feeding a recording material to a position of recording by said recording heads.

34. An apparatus according to claim 29, wherein said recording apparatus is a copying machine.

35. An apparatus according to claim 29, wherein said recording apparatus is a facsimile machine.

36. An apparatus according to claim 29, wherein said recording apparatus is a terminal machine of a computer.

37. An apparatus according to claim 29, wherein the inks are ejected by thermal energy.

38. An apparatus according to claim 29, wherein said converting means converts the multi-level black datum in accordance with a mask pattern determined in accordance with a result of discrimination of said discrimination means.

39. An ink jet recording method using black ink and a plurality of inks having different colors, which have ink penetration properties different from that of said black ink, said method comprising the steps of:

detecting a duty of color image recording in data of a plurality of dots within a specified area on a recording position of a recording material;

changing a ratio of black image recording by mixture of a plurality of the color inks to black image recording by the black ink in a black image area in accordance with the duty detected by said detecting step; and effecting recording based on the ratio changed by said changing step, wherein in said changing step, the ratio increases with an increase of the duty.

40. A method according to claim 39, wherein in said changing step, the ratio of black image recording by mixture of the plurality of the color inks to black image recording by the black ink in a black image area, is changed in accordance with the duty of color image recording in a plurality of specified areas.

41. A method according to claim 39, wherein the color inks include yellow, magenta and cyan inks.

42. A method according to claim 39, wherein the inks are ejected by thermal energy.

43. An ink jet recording method using black ink and a plurality of inks having different colors, which have ink penetration properties different from that of said black ink, said method comprising the steps of:

discriminating a black image area adjacent to a color image;

calculating a color recording duty in data of a plurality of dots within an area marginal to a black image area adjacent to the color image;

determining a ratio of black image recording by mixture of a plurality of color inks to black image recording by the black ink in the black image area, in accordance with a result of calculation of said calculating step; and effecting recording based on the ratio of the black image recording determined by said determining step.

44. A method according to claim 43, wherein in said determining step, the ratio is determined by a mask pattern for recording the black image area.

45. A method according to claim 43, wherein the color inks include yellow, magenta and cyan inks.

46. A method according to claim 43, wherein the inks are ejected by thermal energy.

47. An ink jet recording apparatus using black ink and a plurality of inks having different colors, which have ink penetration properties different from that of said black ink, said apparatus comprising:

means for detecting a duty of color image recording in data of a plurality of dots within a specified area on a recording position of a recording material;

means for changing a ratio of black image recording by mixture of a plurality of the color inks to black image recording by the black ink in a black image area, in accordance with the duty detected by said detecting means; and means for effecting recording based on the ratio changed by said changing means, wherein said changing means increases the ratio with an increase of the color image recording duty in the specified area.

48. An apparatus according to claim 47, wherein said changing means changes the ratio in the black image area in a specified area in accordance with a color image recording duty in a plurality of the specified areas.

49. An apparatus according to claim 47, wherein the color inks include yellow, magenta and cyan inks.

50. An apparatus according to claim 47, wherein the color and black inks are ejected from yellow, magenta, cyan and black recording heads.

51. An apparatus according to claim 50, further comprising a carriage for carrying said recording heads.

52. An apparatus according to claim 50, further comprising feeding means for feeding the recording material to a position of recording by said recording heads.

53. An apparatus according to claim 47, wherein said recording apparatus is a copying machine.

54. An apparatus according to claim 47, wherein said recording apparatus is a facsimile machine.

55. An apparatus according to claim 47, wherein said recording apparatus is a terminal machine of a computer.

56. An apparatus according to claim 47, wherein the inks are ejected by thermal energy.

57. An ink jet recording apparatus using black ink and a plurality of inks having different colors which have ink penetration properties different from that of said black ink, comprising:

means for discriminating a black image area adjacent to a color image;

means for calculating a color recording duty in data of a plurality of dots within an area marginal to a black image area adjacent to the color image;

means for determining a ratio of black pixel recording by mixture of a plurality of the color inks to black pixel recording by the black ink in the black image area, in accordance with a result of calculation of said calculating means; and driving means for effecting recording on the basis of the ratio of the black pixel recording determined by said determining means.

58. An apparatus according to claim 57, wherein said determining means determines the ratio by a mask pattern for recording the black image area.

59. An apparatus according to claim 57, wherein the color inks include yellow, magenta and cyan inks.

60. An apparatus according to claim 57, wherein the color and black inks are ejected from yellow, magenta, cyan and black recording heads.

61. An apparatus according to claim 60, further comprising a carriage for carrying said recording heads.

62. An apparatus according to claim 60, further comprising feeding means for feeding the recording material to a position of recording by said recording head.

63. An apparatus according to claim 57, wherein said recording apparatus is a copying machine.

64. An apparatus according to claim 57, wherein said recording apparatus is a facsimile machine.

65. An apparatus according to claim 57, wherein said recording apparatus is a terminal machine of a computer.

66. An apparatus according to claim 57, wherein the inks are ejected by thermal energy.

* * * * *

CERTIFICATE OF CORRECTION

PATENT NO. : 5,992,971

DATED : November 30, 1999

INVENTOR(S) : TAKAHASHI ET AL.

It is certified that error appears in the above-identified patent and that said Letters Patent is hereby corrected as shown below:

On the title page, item
[56] References Cited:
FOREIGN PATENT DOCUMENTS, "3146355" should read --3-146355-- and "4158049" should read --4-158049--.

COLUMN 1:
Line 52, "certain." should read --certain--.

COLUMN 3:
Line 42, "ration" should read --ratio--.
Line 64, "on" should be deleted.

COLUMN 4:
Line 45, "Rk" should read --Bk--.

COLUMN 5:
Line 13, "and" should read --and a--.
Line 16, "and" should read --and a--.

COLUMN 6:
Line 41, "though" should be deleted.

COLUMN 8:
Line 4, "the" (first occurrence) should read --be--.
Line 20, "drive" should read --drive a--.
Line 22, "312Bk" should read --312Bk.--.

CERTIFICATE OF CORRECTION

PATENT NO. : 5,992,971

DATED : November 30, 1999

INVENTOR(S) : TAKAHASHI ET AL.

It is certified that error appears in the above-identified patent and that said Letters Patent is hereby corrected as shown below:

COLUMN 11:
Line 19, "generated" should read --generated.--.
Line 39, "to" (second occurrence) should be deleted.
Line 48, "It" should read --it--.

COLUMN 12:
Line 46, "pixel.," should read --pixel--.

COLUMN 15:
Line 15, "UCR." should read --UCR--.

COLUMN 16:
Line 7, "On" should read --In--.

COLUMN 17:
Line 39, "dot" should read --dots--.

COLUMN 18:
Line 59, "showing)." should read --sharing).--.

COLUMN 19:
Line 66, "heads" should read --plural heads--.

COLUMN 21:
Line 32, "recording;" should read -- recording datum;--.

UNITED STATES PATENT AND TRADEMARK OFFICE
CERTIFICATE OF CORRECTION

PATENT NO. : 5,992,971

DATED : November 30, 1999

INVENTOR(S) : TAKAHASHI ET AL.

It is certified that error appears in the above-identified patent and that said Letters Patent is hereby corrected as shown below:

COLUMN 22:
Line 1, "bust" should read --first--.

Signed and Sealed this

Twentieth Day of February, 2001

Attest:

NICHOLAS P. GODICI

*Attesting Officer*

*Acting Director of the United States Patent and Trademark Office*